(12) United States Patent
Hirao

(10) Patent No.: US 10,819,878 B2
(45) Date of Patent: Oct. 27, 2020

(54) IMAGE PROCESSING APPARATUS CAPABLE OF SUPPRESSING ERRORS RELATED TO DOCUMENT CONVEYING SPEED AND DATA TRANSFER RATE, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Toyomi Hirao, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/658,645

(22) Filed: Oct. 21, 2019

(65) Prior Publication Data

US 2020/0137261 A1    Apr. 30, 2020

(30) Foreign Application Priority Data

Oct. 30, 2018    (JP) .................................. 2018-204138

(51) Int. Cl.
*H04N 1/32*    (2006.01)
*H04N 1/047*    (2006.01)

(52) U.S. Cl.
CPC ......... *H04N 1/32683* (2013.01); *H04N 1/047* (2013.01); *H04N 2201/0094* (2013.01); *H04N 2201/04756* (2013.01)

(58) Field of Classification Search
CPC .............. H04N 1/32683; H04N 1/047; H04N 2201/04756; H04N 2201/0094

USPC ....................................................... 358/1.14
See application file for complete search history.

(56) References Cited

U.S. PATENT DOCUMENTS

| 2013/0002781 | A1* | 1/2013 | Kamijo | ............. | G03G 15/5029 347/118 |
| 2014/0078558 | A1* | 3/2014 | Kanaya | ............. | H04N 1/00005 358/448 |
| 2014/0168730 | A1* | 6/2014 | Nakamura | ............. | H04N 1/047 358/498 |
| 2015/0358503 | A1* | 12/2015 | Hirao | ................... | H04N 1/0443 358/474 |
| 2018/0213100 | A1* | 7/2018 | Wu | .......................... | B65H 1/14 |

FOREIGN PATENT DOCUMENTS

| JP | H11301881 A | 11/1999 |
| JP | 2013153521 A | 8/2013 |

* cited by examiner

*Primary Examiner* — Allen H Nguyen
(74) *Attorney, Agent, or Firm* — Rossi, Kimms & McDowell LLP

(57) ABSTRACT

An image processing apparatus capable of suppressing occurrence of an error due to an increase in the amount of data transfer per unit time while suppressing occurrence of an error due to thickness of a conveyed document sheet. A conveying speed of a document sheet is controlled based on the thickness thereof. As a frequency of an image transfer clock for transferring image data of the document sheet from a scanner section to an image processor, a frequency is used which is the lower of a first frequency determined based on whether an image processing process is executed in parallel with any other image processing process different from the image processing process and a second frequency determined based on the thickness of the document sheet.

5 Claims, 22 Drawing Sheets

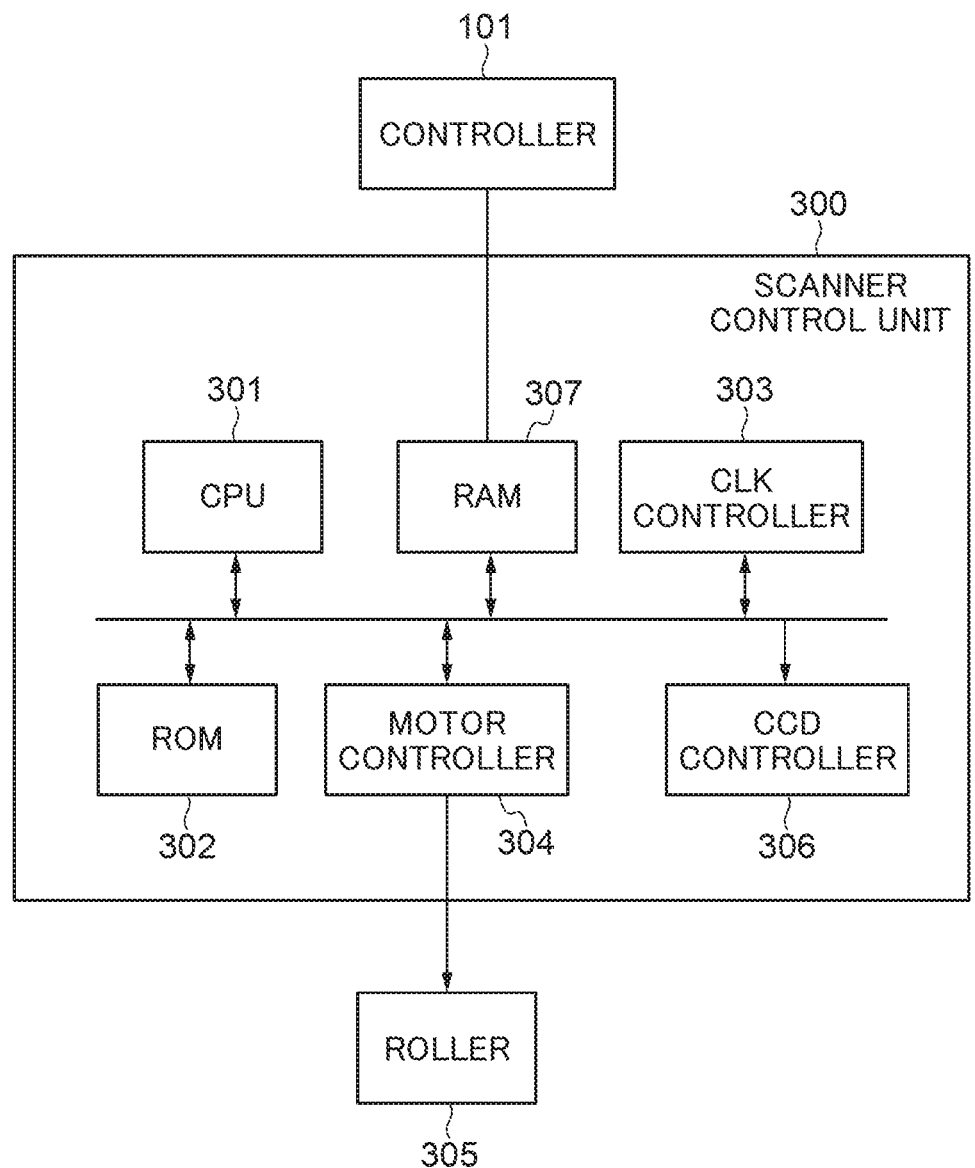

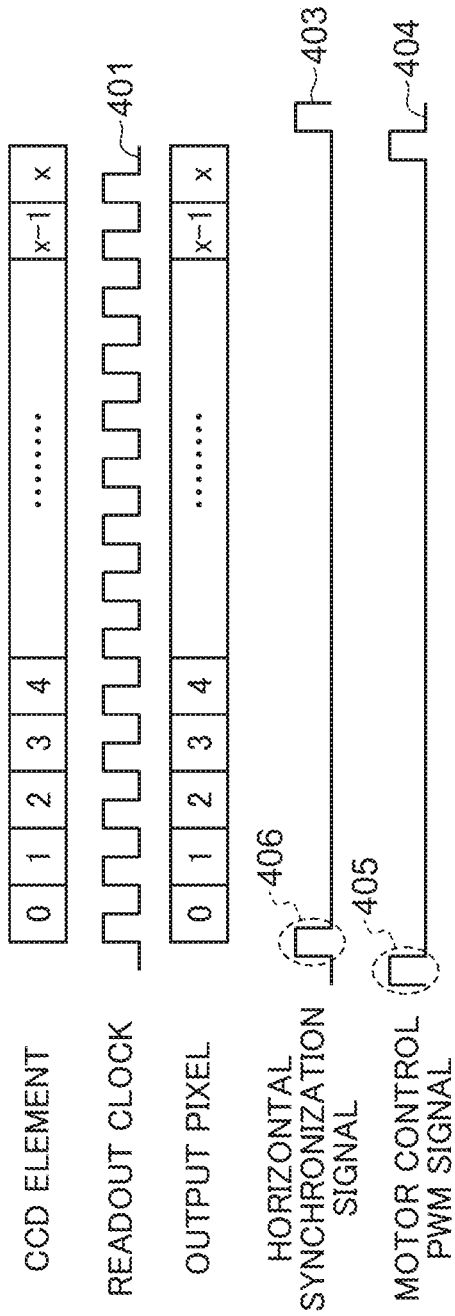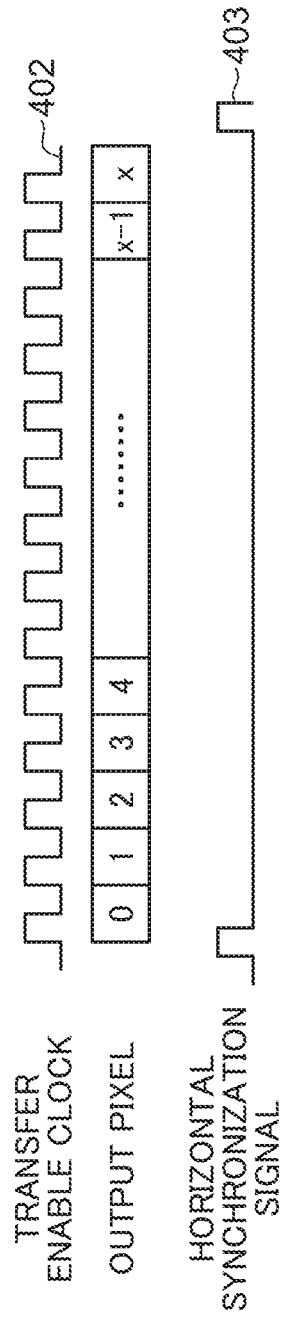

FIG. 14A

| TRANSFER MODE | SINGLE TRANSFER MODE | PARALLEL TRANSFER MODE | ... |
|---|---|---|---|
| CONVEYANCE CONTROL CLOCK | 64Mhz | 64Mhz | |
| IMAGE TRANSFER CLOCK | 64Mhz | 50Mhz | |
| ... | | | |

| | THICK PAPER MODE | THIN PAPER MODE | NORMAL PAPER MODE |
|---|---|---|---|
| CONVEYANCE CONTROL CLOCK | 50Mhz | 52Mhz | 64Mhz |
| IMAGE TRANSFER CLOCK | 50Mhz | 52Mhz | 64Mhz |
| ... | | | |

| TRANSFER MODE | SINGLE TRANSFER MODE | PARALLEL TRANSFER MODE | SINGLE TRANSFER & THICK PAPER MODE | SINGLE TRANSFER & THIN PAPER MODE | PARALLEL TRANSFER & THICK PAPER MODE | PARALLEL TRANSFER & THIN PAPER MODE | ... |
|---|---|---|---|---|---|---|---|
| CONVEYANCE CONTROL CLOCK | 64Mhz | 64Mhz | 50Mhz | 52Mhz | 50Mhz | 52Mhz | |
| IMAGE TRANSFER CLOCK | 64Mhz | 50Mhz | 50Mhz | 52Mhz | 50Mhz | 50Mhz | |
| ... | | | | | | | |

HIGH-SPEED TRANSFER MODE

| | | | | | |
|---|---|---|---|---|---|
| SCAN | ○ | ○ | ○ | ○ | ○ |
| PRINT |  | ○ |  |  |  |
| RIP |  |  | ○ |  |  |
| SEND |  |  |  | ○ |  |
| FAX |  |  |  |  | ○ |

FIG. 19B

NORMAL TRANSFER MODE

| | | | | | | | |
|---|---|---|---|---|---|---|---|
| SCAN | ○ | ○ | ○ | ○ | ○ | ○ | ○ |
| PRINT | ○ | ○ | ○ | ○ |  |  |  |
| RIP | ○ |  |  |  | ○ | ○ |  |
| SEND |  | ○ | ○ |  | ○ |  | ○ |
| FAX |  |  |  | ○ |  | ○ | ○ |

FIG. 19C

LOW-SPEED TRANSFER MODE

| | | | | | |
|---|---|---|---|---|---|
| SCAN | ○ | ○ | ○ | ○ | ○ |
| PRINT | ○ | ○ | ○ |  | ○ |
| RIP | ○ | ○ |  | ○ | ○ |
| SEND | ○ |  | ○ | ○ | ○ |
| FAX |  | ○ | ○ | ○ | ○ |

*FIG. 20A*

| TRANSFER MODE | HIGH-SPEED TRANSFER MODE | NORMAL TRANSFER MODE | LOW-SPEED TRANSFER MODE | ... |
|---|---|---|---|---|
| CONVEYANCE CONTROL CLOCK | 64Mhz | 64Mhz | 48Mhz | ... |
| IMAGE TRANSFER CLOCK | 64Mhz | 50Mhz | 48Mhz | ... |
| ... | ... | ... | ... | |

*FIG. 20B*

| | THICK PAPER MODE | THIN PAPER MODE |
|---|---|---|
| CONVEYANCE CONTROL CLOCK | 50Mhz | 52Mhz |
| IMAGE TRANSFER CLOCK | 50Mhz | 52Mhz |
| ... | ... | ... |

IMAGE PROCESSING APPARATUS CAPABLE OF SUPPRESSING ERRORS RELATED TO DOCUMENT CONVEYING SPEED AND DATA TRANSFER RATE, METHOD OF CONTROLLING IMAGE PROCESSING APPARATUS, AND STORAGE MEDIUM

BACKGROUND OF THE INVENTION

Field of the Invention

The present invention relates to an image processing apparatus, a method of controlling the same, and a storage medium.

Description of the Related Art

As an image processing apparatus equipped with a plurality of functions, such as a scan function and a print function, an MFP (Multi-Function Peripheral) is known. In the MFP, a scanner section reads a document sheet at a reading speed set by a user and transfers image data of the read document sheet to an image processor according to an image transfer clock of a predetermined frequency. The image processor performs an image processing process on the received image data, temporarily stores the processed image data in a main memory of the MFP, and further, acquires the processed image data from the main memory when performing other image processing process(es) on the processed image data. In the MFP, the scanner section, the image processor, and the main memory operate to transfer data via one image bus. In recent years, there has been developed an MFP capable of achieving high-speed reading, and in a case where a scan job for high-speed reading is executed, the amount of data transfer per unit time (data transfer rate) via the image bus is increased, compared with a case where a scan job for normal-speed reading is executed. Further, in the MFP, the image processor also performs image processing and the like on PDL data to be printed by a print section, and the print section and the image processor transfer data via the above-mentioned image bus.

In the MFP, there is a case where during execution of a scan job for high-speed reading, execution of another job, such as a print job, is instructed and the scan job for high-speed reading is executed in parallel with the print job. In this case, in the MFP, the scanner section, the print section, the image processor, and the main memory perform data transfer in parallel via the image bus, and hence the amount of data to be transferred per unit time via the image bus becomes so large to exceed an upper limit of the amount of data transferable via the image bus. As a result, data transfer via the image bus cannot be performed, causing an error in which execution of the scan job for high-speed reading and the print job is stopped. To cope with this, in a conventional technique, for example, an MFP controls the amount of data transfer per unit time via the image bus (see e.g. Japanese Laid-Open Patent Publication (Kokai) No. 2013-153521).

On the other hand, to prevent occurrence of a jam caused due to a thickness of a conveyed document sheet, an MFP performs control related to conveyance of the document sheet according to the thickness of the document sheet (see e.g. Japanese Laid-Open Patent Publication (Kokai) No. H11-301881).

However, in the conventional MFPs, if an occurrence condition of an error due to an increase in the amount of data transfer per unit time via the image bus and an occurrence condition of an error due to the thickness of a conveyed document sheet are simultaneously satisfied, it is impossible to prevent occurrence of both of these errors. For example, if the document conveying speed is controlled to be reduced so as to prevent occurrence of an error due to the thickness of the conveyed document sheet, the amount of data read by the scanner section per unit time is reduced, and hence the amount of data transferred per unit time via the image bus is also reduced. With this control, it is possible to suppress occurrence of an error due to the thickness of the conveyed document sheet. However, unless the amount of data transfer per unit time via the image bus is suppressed to an amount small enough to make it possible to execute another job in parallel, it is impossible to suppress occurrence of an error due to an increase in the amount of data to be transferred per unit time via the image bus.

SUMMARY OF THE INVENTION

The present invention provides an image processing apparatus capable of suppressing occurrence of an error due to an increase in the amount of data transfer per unit time (data transfer rate) via an image bus, while suppressing occurrence of an error due to the thickness of a conveyed document sheet, a method of controlling the image processing apparatus, and a storage medium.

In a first aspect of the present invention, there is provided an image processing apparatus including a reading unit that reads a document sheet, and an image processing unit that performs an image processing process on image data obtained by reading the document sheet, comprising a conveying speed control unit configured to control a conveying speed of the document sheet based on a thickness of the document sheet, a clock control unit configured to control a frequency of an image transfer clock for transferring image data of the document sheet from the reading unit to the image processing unit, a first determination unit configured to determine a first frequency based on whether or not the image processing process is executed in parallel with any other image processing process different from the image processing process, and a second determination unit configured to determine a second frequency based on the thickness of the document sheet, wherein the clock control unit uses a frequency which is the lower of the first frequency and the second frequency as the frequency of the image transfer clock.

In a second aspect of the present invention, there is provided a method of controlling an image processing apparatus including a reading unit that reads a document sheet, and an image processing unit that performs an image processing process on image data obtained by reading the document sheet, comprising controlling a conveying speed of the document sheet based on a thickness of the document sheet, controlling a frequency of an image transfer clock for transferring image data of the document sheet from the reading unit to the image processing unit, determining a first frequency based on whether or not the image processing process is executed in parallel with any other image processing process different from the image processing process, determining a second frequency based on the thickness of the document sheet, and using a frequency which is the lower of the first frequency and the second frequency as the frequency of the image transfer clock.

In a third aspect of the present invention, there is provided a non-transitory computer-readable storage medium storing a computer-executable program for executing a method of controlling an image processing apparatus including a reading unit that reads a document sheet, and an image processing unit that performs an image processing process on image data obtained by reading the document sheet, wherein the method comprises controlling a conveying speed of the document sheet based on a thickness of the document sheet, controlling a frequency of an image transfer clock for transferring image data of the document sheet from the reading unit to the image processing unit, determining a first frequency based on whether or not the image processing process is executed in parallel with any other image processing process different from the image processing process, determining a second frequency based on the thickness of the document sheet, and using a frequency which is the lower of the first frequency and the second frequency as the frequency of the image transfer clock.

According to the present invention, it is possible to suppress occurrence of an error due to an increase in the amount of data transfer per unit time via the image bus, while suppressing occurrence of an error due to the thickness of the conveyed document sheet.

Further features of the present invention will become apparent from the following description of exemplary embodiments (with reference to the attached drawings).

BRIEF DESCRIPTION OF THE DRAWINGS

FIG. 3 is a schematic block diagram of a scanner control unit of the scanner section appearing in FIG. 1.

FIGS. 4A and 4B are diagrams useful in explaining clocks for controlling readout of an image, performed by a CIS appearing in FIG. 2.

FIGS. 14A to 14C are diagrams showing examples of management tables managed by the MFP shown in FIG. 1.

FIGS. 19A to 19C are diagrams each showing an example of combinations of image processing processes, each of which can be executed in parallel in an associated transfer mode.

FIGS. 20A and 20B are diagrams showing examples of management tables managed by the MFP shown in FIG. 1.

DESCRIPTION OF THE EMBODIMENTS

The present invention will now be described in detail below with reference to the accompanying drawings showing embodiments thereof. First, a description will be given of an image processing apparatus according to a first embodiment of the present invention.

Figure 1:
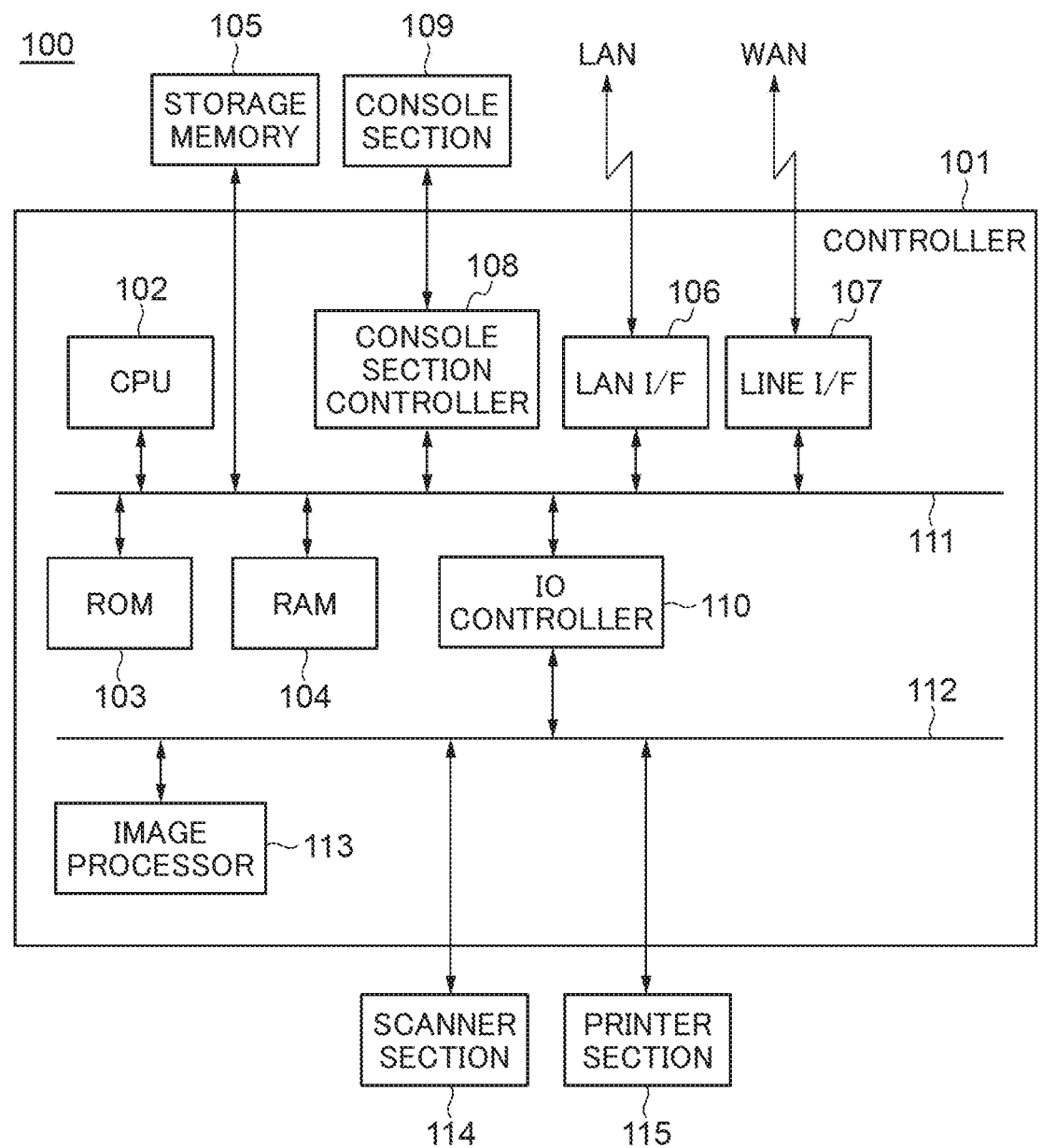
FIG. 1 is a schematic block diagram of an MFP as an image processing apparatus according to a first embodiment of the present invention.

FIG. 1 is a schematic block diagram of an MFP 100 as the image processing apparatus according to the first embodiment of the present invention.

Referring to FIG. 1, the MFP 100 includes a controller 101, a storage memory 105, a console section 109, a scanner section 114, and a printer section 115. The controller 101 is connected to the storage memory 105, the console section 109, the scanner section 114, and the printer section 115. Further, the controller 101 includes a CPU 102, a ROM 103, a RAM 104, a LAN interface 106, a line interface 107, a console section controller 108, an IO controller 110, and an image processor 113. The CPU 102, the ROM 103, the RAM 104, the LAN interface 106, the line interface 107, the console section controller 108, and the IO controller 110 are interconnected via a system bus 111. The image processor 113 is connected to the IO controller 110 via an image bus 112.

The controller 101 controls the overall operation of the MFP 100. The CPU 102 causes software modules (not shown) of the MFP 100 to execute respective processing operations by executing programs stored in the ROM 103 and the storage memory 105. The ROM 103 stores a boot program of the system and the like. The RAM 104 is a system work memory for the CPU 102 that executes the software modules (not shown) of the MFP 100. Further, the RAM 104 is an image memory for temporarily storing, when processing image data, the image data. The storage memory 105 is implemented by an HDD (Hard Disk Drive) or an SSD (Solid State Drive), and is used as an internal storage. The storage memory 105 stores system software modules for realizing the functions of the MFP 100 and image data transferred from the RAM 104.

The LAN interface 106 is for connecting the MFP 100 to a LAN. The LAN interface 106 performs data communication with an external apparatus connected to the LAN. The line interface 107 is for connecting the MFP 100 to a WAN. The line interface 107 performs data communication with an external apparatus connected to the WAN. The console section controller 108 is an interface between the controller 101 and the console section 109. For example, the console section controller 108 outputs a VGA signal to the console section 109, and causes the console section 109 to display an image corresponding to the VGA signal. Further, the console section controller 108 outputs information input by a user on the console section 109 to the CPU 102. The console section 109 is formed by an LCD touch panel, etc. The console section 109 interprets the VGA signal output from the console section controller 108 and displays an image corresponding to the VGA signal.

The IO controller 110 is a bus bridge that connects between the system bus 111 and the image bus 112, and converts the data structure of image data transferred between the system bus 111 and the image bus 112. The image bus 112 is implemented by a general-purpose bus, such as a PCI bus, an IEEE1394 bus or a PCIEx bus, and transfers image data at high speed. To the image bus 112, not only the IO controller 110 and the image processor 113, but also the scanner section 114 and the printer section 115 are connected. The image bus 112 performs synchronous/asynchronous conversion of image data. The image processor 113 is formed by a plurality of ASICs, as described hereinafter with reference to FIG. 7. The image processor 113 performs image processing processes on image data, such as resolution conversion processing, compression processing, expansion processing, and binary/multi-value conversion processing. The scanner section 114 includes a DF (Document Feeder) unit 200 appearing in FIG. 2 and a scanner control unit 300 appearing in FIG. 3. The scanner section 114 reads a document sheet to generate image data. The printer section 115 prints the image data generated by the scanner section 114.

Figure 2:
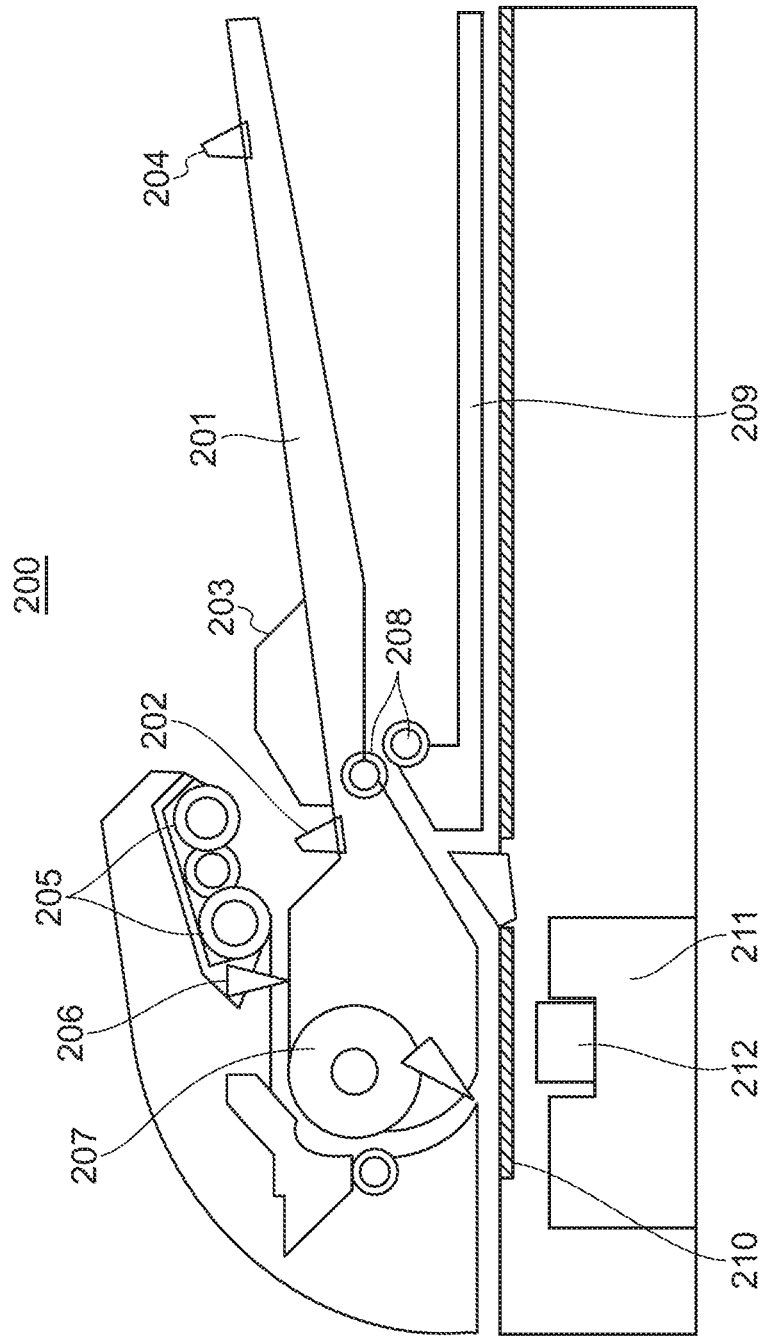
FIG. 2 is a schematic side view showing the internal structure of a DF unit of a scanner section appearing in FIG. 1.

FIG. 2 is a schematic side view showing the internal structure of the DF unit 200 of the scanner section 114 appearing in FIG. 1. Note that FIG. 2 shows the internal structure in a seen-through state for ease of understanding.

The DF unit 200 is provided with a document tray 201 for placing document sheets thereon. The document tray 201 is provided with a document sensor 202, two document sheet guides 203, and a document sheet size detection sensor 204. The document sensor 202 detects whether or not any document sheet is placed on the document tray 201. The two document sheet guides 203 are arranged such that they are opposed to each other along a direction orthogonal to a direction of conveying document sheets. Each document sheet placed on the document tray 201 is conveyed by the three types of rollers: pickup rollers 205, a conveying roller 207, and discharge rollers 208. The pickup rollers 205 convey a document sheet placed on the document tray 201 into a document conveying path (not shown) of the DF unit 200. The document sheet conveyed by the pickup rollers 205 is detected by a document passage detection sensor 206. In the DF unit 200, whether or not a first document sheet has passed is determined based on a time at which the first document sheet is detected by the document passage detection sensor 206. The conveying roller 207 conveys the document sheet conveyed into the document conveying path by the pickup rollers 205 to the discharge rollers 208. The discharge rollers 208 convey the document sheet conveyed by the conveying roller 207 onto a discharge tray 209. Note that the pickup rollers 205, the conveying roller 207, and the discharge rollers 208 are each driven by a stepping motor (not shown).

The document sheet conveyed into the above-mentioned document conveying path is read by a sensor unit 211 when passing a transparent DF reading window 210 provided on the document conveying path. The sensor unit 211 includes a CIS (Contact Image Sensor) 212 and is arranged at a location where the CIS 212 can read through the DF reading window 210 a document sheet being conveyed along the document conveying path. The sensor unit 211 is freely movable in a sub scanning direction. For example, the sensor unit 211 moves in the same direction as the direction of conveying the document sheet, which is conveyed from the conveying roller 207 to the discharge rollers 208. Note that the DF reading window 210 has a certain length in the sub scanning direction. The CIS 212 can move to a desired position within a range of the length of the DF reading window 210 and read a document sheet at the position to which it is moved. The CIS 212 is comprised of a plurality of photoelectric conversion elements, such as CCD elements. In the CIS 212, the CCD elements are arranged in a single line. The CIS 212 generates a control signal for controlling a FIFO buffer (not shown) or the like for accumulating image data read by the CCD elements.

FIG. 3 is a schematic block diagram of the scanner control unit 300 of the scanner section 114 appearing in FIG. 1.

Referring to FIG. 3, the scanner control unit 300 includes a CPU 301, a ROM 302, a clock controller 303 (clock control unit), a motor controller 304, a CCD controller 306, and a RAM 307.

The scanner control unit 300 controls the operation of the scanner section 114 by causing the CPU 301 to execute a scanner section control application (program), not shown, stored in the ROM 302. The scanner section control application is a program for controlling the scanner control unit 300. Note that although in the present embodiment, the description will be given of a case where the CPU 301 executes the scanner section control application, a device that executes the scanner section control application is not limited to the CPU 301. For example, the CPU 102 of the controller 101 may execute the scanner section control application to thereby control the operation of the scanner section 114.

The clock controller 303 provides clocks to devices as components of the scanner control unit 300. The clocks include image transfer clocks, referred to hereinafter, and so forth. The clock controller 303 is comprised of a crystal vibration element (not shown) which generates a clock and a PLL (Phase-Locked Loop) (not shown). The PLL multiplies or divides the frequency of a clock generated by the crystal vibration element. When a scan execution instruction is received from the user, in the scanner section 114, the clock controller 303 outputs clocks to the motor controller 304, the CCD controller 306, and the RAM 307. For example, the motor controller 304 generates a control clock for a motor (not shown) that causes a roller 305 to rotate, based on the clock received from the clock controller 303. The scan execution instruction includes information on color/monochrome discrimination, a resolution, and so forth. The scanner section control application changes the settings of the PLL of the clock controller 303 based on the contents of the scan execution instruction. The clock controller 303 makes settings of the PLL, concerning the frequency of a clock to be output, based on a management table 1401 shown in FIG. 14A and a management table 1402 shown in FIG. 14B, described hereinafter. With this, the reading speed and the document conveying speed of the scanner section 114 are controlled. The RAM 307 stores image data of a document sheet read by the CIS 212. The RAM 307 has a storage capacity large enough to store only image data of approximately four sheets of A4 size.

The scanner control unit 300 controls readout of images, performed by the CIS 212, based on a readout clock 401 appearing in FIG. 4A and a transfer enable clock 402 appearing in FIG. 4B. The readout clock 401 is a clock signal for reading out pixel data forming image data from each CCD element. The transfer enable clock 402 is an image transfer clock. The image transfer clock is a clock signal for controlling whether or not to transfer the read pixel data to the controller 101. The scanner control unit 300 reads out pixel data from each CCD element at each time when the readout clock 401 rises, during a time period from when one pulse of a horizontal synchronization signal 403 appearing in FIG. 4A is output to when the next pulse of the same is output. The horizontal synchronization signal 403 is a signal for controlling the start of capturing pixel data from one line of the CCD elements. The pixel data read out from each CCD element is accumulated in the RAM 307.

Further, the scanner control unit 300 generates a motor control PWM signal 404 for driving the pickup rollers 205 provided in the scanner section 114. Whenever the scanner control unit 300 outputs a pulse 405 of the motor control PWM signal 404, the pickup rollers 205 rotate by an amount corresponding to one line to thereby convey a document sheet. The scanner control unit 300 controls the signals such that, as shown in FIG. 4A, the pulse 405 of the motor control PWM signal 404 is output, and further, a pulse 406 of the horizontal synchronization signal 403 is output after the lapse of a predetermined time period required for stabilization of vibration. In the MFP 100, in a case where high-speed reading is performed, the periods of the horizontal synchronization signal 403 and the motor control PWM signal 404 are shortened. With this, the rotational speed of the pickup rollers 205 is relatively increased to increase the document conveying speed, and the reading speed per one document sheet is increased. Further, to read out pixel data from the CCD elements in a short time period in accordance with the document reading speed, the scanner control unit 300 increases the frequency of the readout clock 401. The scanner control unit 300 accumulates pixel data in the RAM 307 in synchronism with the period of the readout clock 401. Further, the scanner control unit 300 increases the frequency of the transfer enable clock 402 in accordance with the control of the frequency of the readout clock 401 to thereby transfer the pixel data from the RAM 307 to the controller 101 in a short time period.

Figure 5:
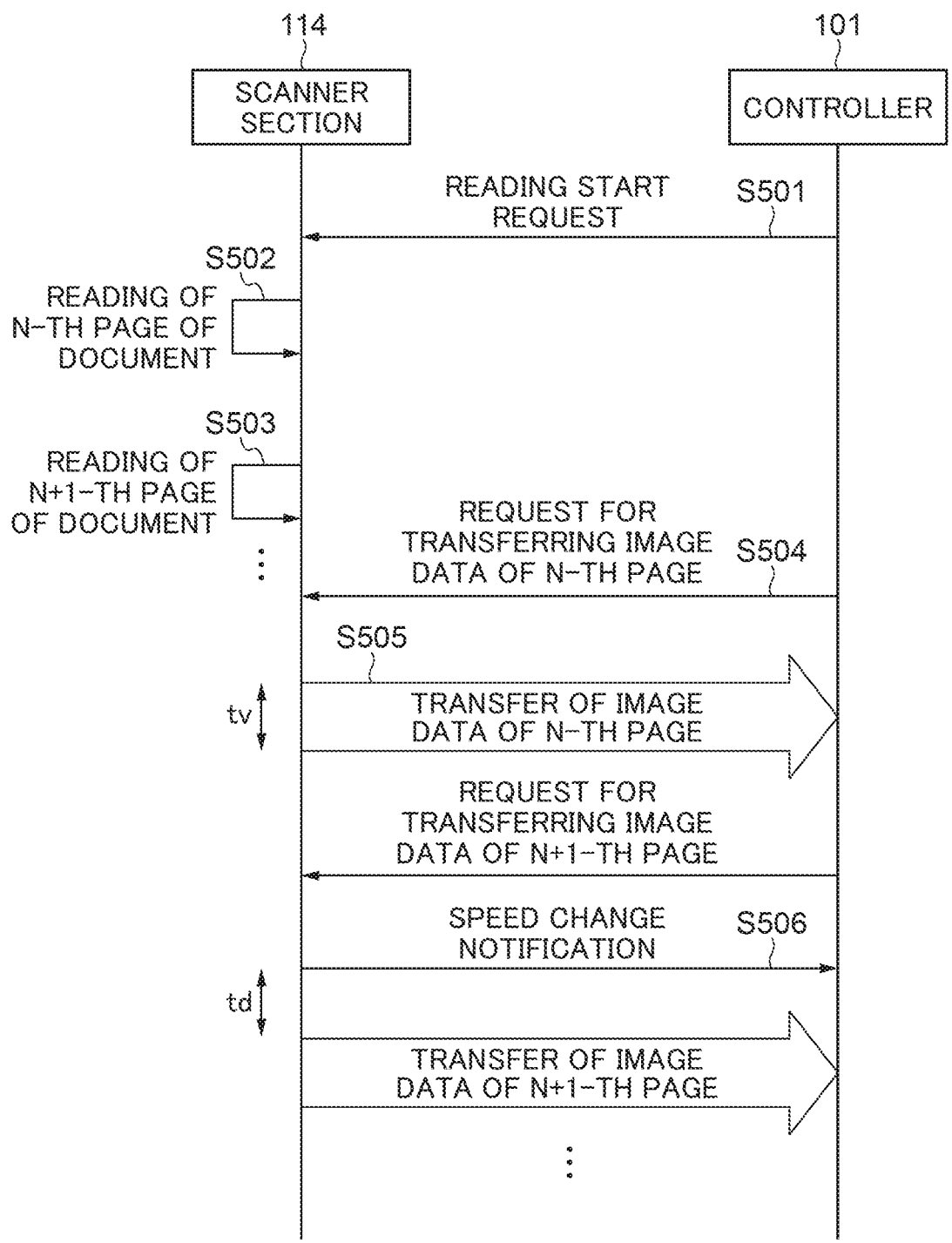
FIG. 5 is a sequence diagram related to an image reading operation performed by the MFP shown in FIG. 1.

FIG. 5 is a sequence diagram related to an image reading operation performed by the MFP 100 shown in FIG. 1. The reading operation shown in FIG. 5 is executed by the above-mentioned scanner section control application that controls the scanner section 114 and a job control application (not shown) that controls the controller 101.

Referring to FIG. 5, when the scanner section 114 receives a reading start request from the controller 101 (step S501), the scanner section 114 reads an N-th page of a document based on the readout clock 401 (step S502). Image data of the N-th page, formed by a plurality of pixel data items read by the CCD elements, is stored in the RAM 307. When reading of the N-th page of the document is completed, the scanner section 114 reads the next page (N+1-th page) of the document (step 503).

Figure 6:
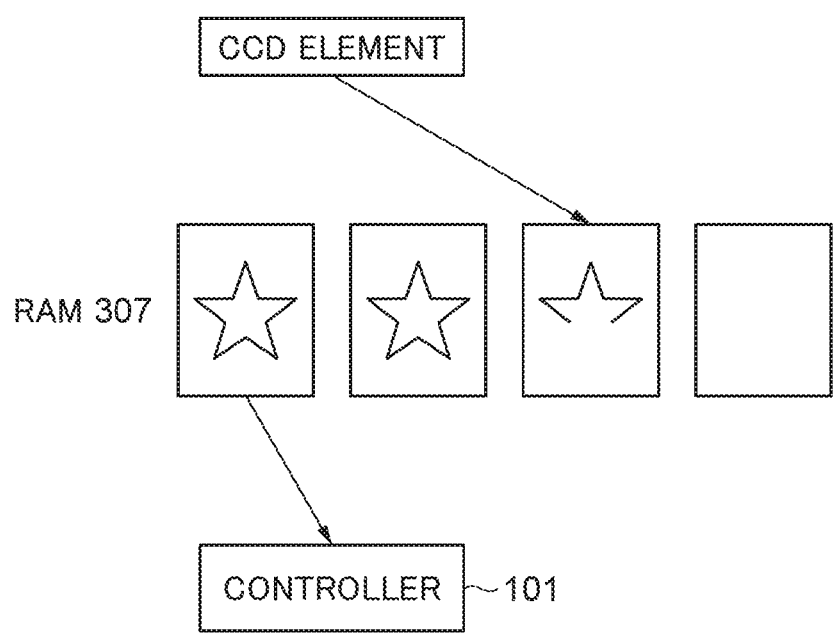
FIG. 6 is a diagram useful in explaining transfer of image data from a RAM to a controller both appearing in FIG. 3.

On the other hand, when the scanner section 114 receives a request from the controller 101, for transferring the image data of the N-th page (step S504), the scanner section 114 transfers the image data of the N-th page to the controller 101 based on the transfer enable clock 402 (step S505) over a transfer time period tv. The image data which has been transferred to the controller 101 is deleted from the RAM 307. Note that in the MFP 100, as shown in FIG. 6, since image data of more than four pages cannot be stored in the RAM 307, data transfer is controlled such that the image data stored in the RAM 307 is transferred to the controller 101 before the storage area of the RAM 307 is used up. In the present embodiment, the description will be given assuming that in a case where the frequency of the transfer enable clock is changed after the controller 101 has issued a reading start request and before the scanner section 114 starts reading, the MFP 100 is configured to operate as follows: The MFP 100 is not required to perform reset processing between the controller 101 and the scanner section 114. However, the configuration of the MFP 100 is not limited to this. For example, in a case where the frequency of the transfer enable clock is changed as mentioned above, the MFP 100 may execute reset processing between the controller 101 and the scanner section 114. When performing reset processing, a speed change notification is transmitted and received between the controller 101 and the scanner section 114. When the scanner section 114 transmits a speed change notification to the controller 101 (step S506), the controller 101 restarts to transfer image data after a switching control time period td elapses. The switching control time period td is defined as a control protocol between the control applications in advance. Alternatively, the switching control time period td is transmitted and received between the respective controllers as control information.

Figure 7:
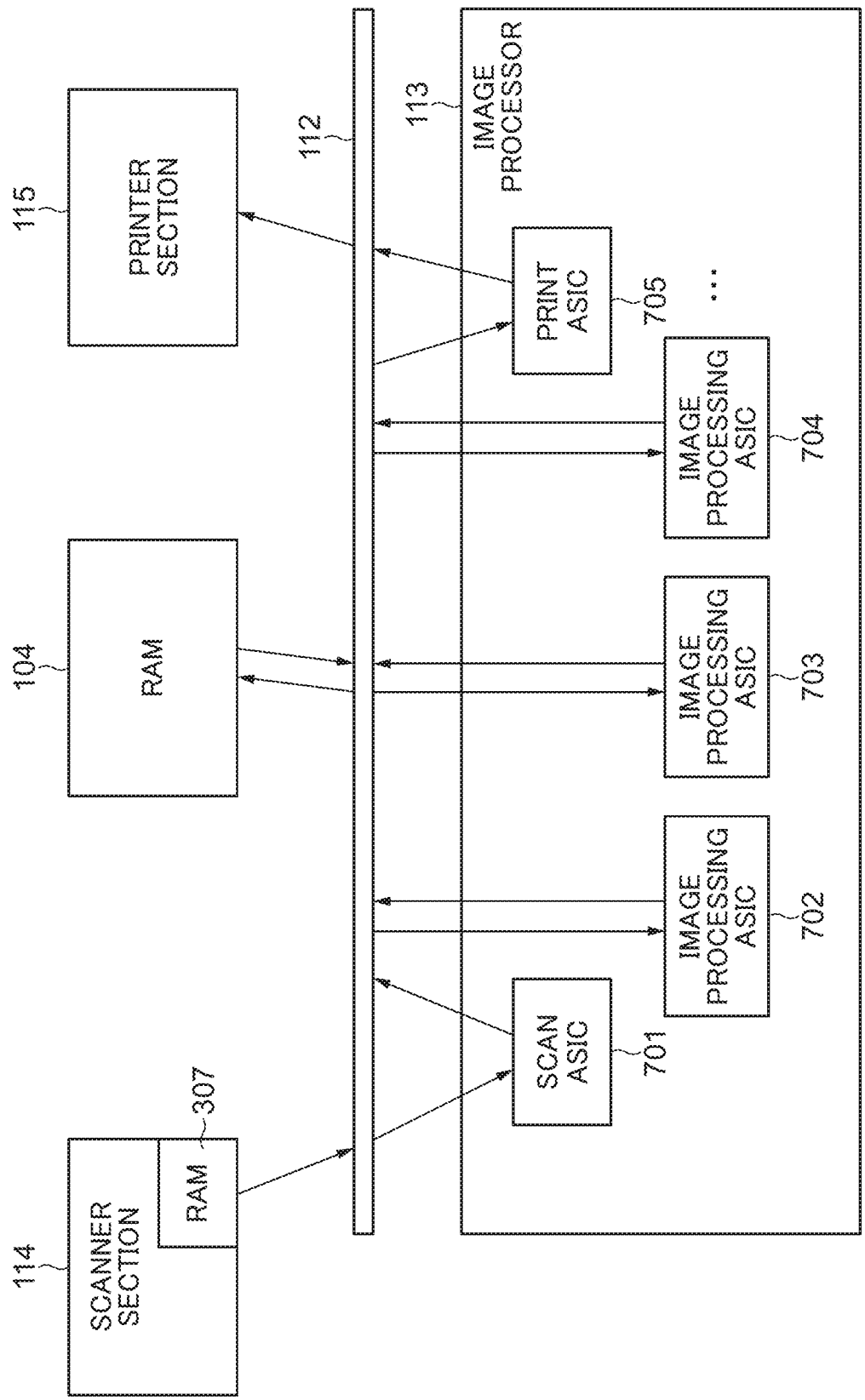
FIG. 7 is a block diagram useful in explaining the configuration of an image processor appearing in FIG. 1.

FIG. 7 is a block diagram useful in explaining the configuration of the image processor 113 appearing in FIG. 1. Referring to FIG. 7, the image processor 113 includes the plurality of ASICs, denoted by reference numerals 701 to 705, i.e. a scan ASIC 701, image processing ASICs 702 to 704, and a print ASIC 705, that perform different image processing processes, such as resolution conversion, compression/expansion, and binary/multi-value conversion, on the image data. The ASICs 701 to 705 shares the RAM 104 and perform inputting and outputting of data via the image bus 112. The image processor 113 is capable of executing the plurality of image processing processes in parallel by using the ASICs 701 to 705. For example, a scanned image processing process by the scan ASIC 701 is performed in parallel with an image processing process by the image processing ASIC 702. In doing this, data transfer is performed via the image bus 112 in each image processing process and hence the image bus 112 is congested. Further, in a case where the scanner section 114 performs high-speed reading in the scanned image processing process, the amount of data transfer per unit time (data transfer rate) via the image bus 112 becomes so large that it exceeds the upper limit of the amount of data transferable via the image bus 112. If the amount of data transfer per unit time via the image bus 112 exceeds the upper limit, data transfer via the image bus 112 cannot be performed, which causes an error that execution of each image processing process is stopped. To cope with this, conventionally, the amount of data transfer per unit time via the image bus 112 is controlled, for example, by reducing the reading speed of the scanner section 114.

On the other hand, in the MFP 100, a jam or a stacking failure is sometimes caused depending on the thickness of a conveyed document sheet. For example, in a case where a conveyed document sheet is thin paper, the weight of the document sheet itself is light and hence it takes some time before the document sheet discharged on the discharge tray 209 completely falls, so that a rear edge of the document sheet sometimes collides with a front edge of the following document sheet, causing a jam or a stacking failure. To solve the problems of such a jam and a stacking failure, conventionally, the document conveying speed is controlled to be lower than a normal speed set in advance, according to the thickness of the document sheet.

However, in the conventional MFP, if an occurrence condition of an error due to an increase in the amount of data transfer per unit time via the image bus 112 and an occurrence condition of an error due to the thickness of a conveyed document sheet are simultaneously satisfied, it is impossible to prevent occurrence of both of these errors. For example, if the document conveying speed is reduced so as to prevent occurrence of an error due to the thickness of the conveyed document sheet, the amount of data read by the scanner section 114 per unit time is reduced, and hence the amount of data transfer per unit time via the image bus 112 is also reduced. With this control, it is possible to suppress occurrence of an error due to the thickness of the conveyed document sheet. However, unless the amount of data transfer per unit time via the image bus 112 is suppressed to be small enough to make it possible to execute another job in parallel by the above-described control, it is impossible to suppress occurrence of an error due to the increase in the amount of data transfer per unit time via the image bus.

To cope with this, in the present embodiment, the document conveying speed is set based on the thickness of the document sheet placed on the document tray 201. Further, in the present embodiment, a first frequency is determined based on whether or not an image processing process is executed in parallel with any other image processing process which is different from the image processing process, and a second frequency is determined based on document sheet thickness information, referred to hereinafter. A frequency which is the lower of the first frequency and the second frequency is used as the frequency of the transfer enable clock 402.

Figure 8:
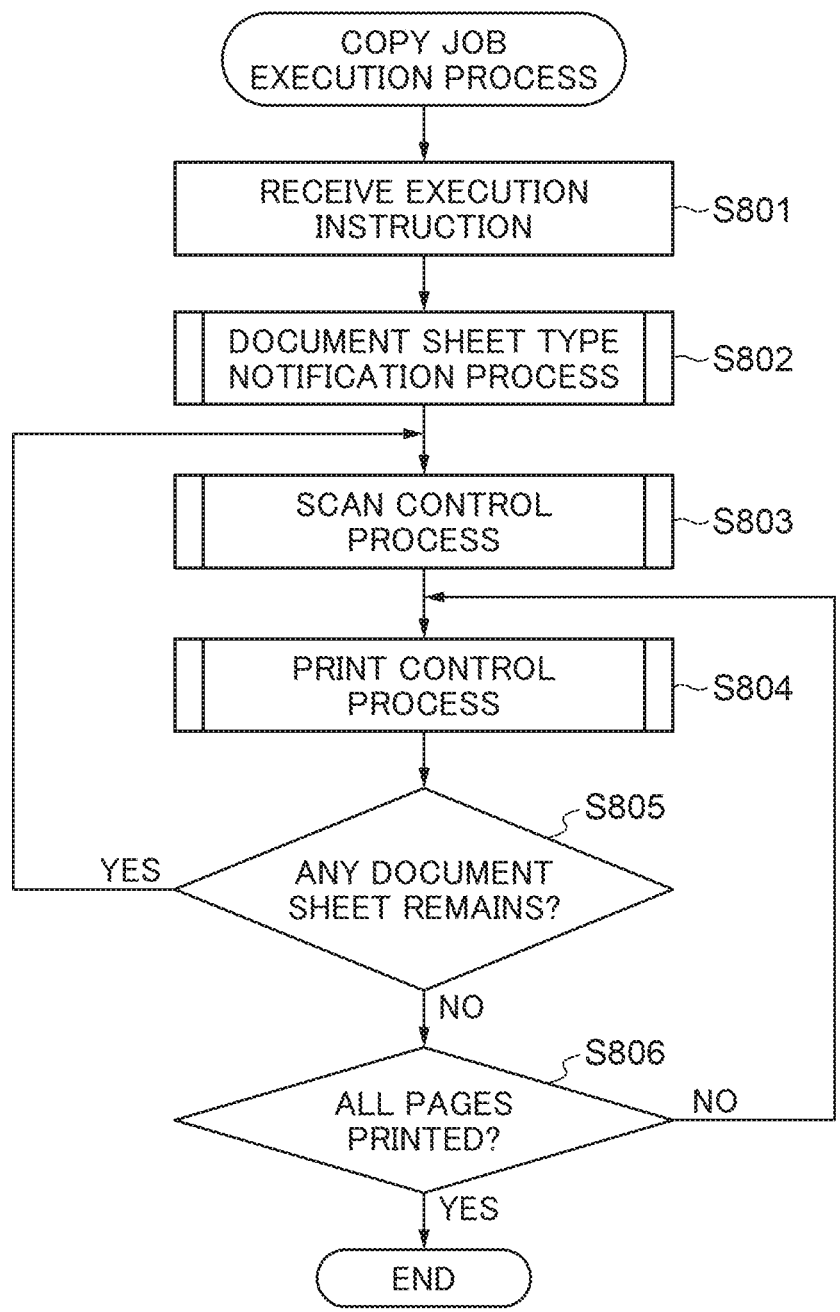
FIG. 8 is a flowchart of a copy job execution process performed by the MFP shown in FIG. 1.

FIG. 8 is a flowchart of a copy job execution process performed by the MFP 100 shown in FIG. 1. The process in FIG. 8 is performed by the CPU 102 that executes an associated program stored e.g. in the ROM 103.

Figure 9:
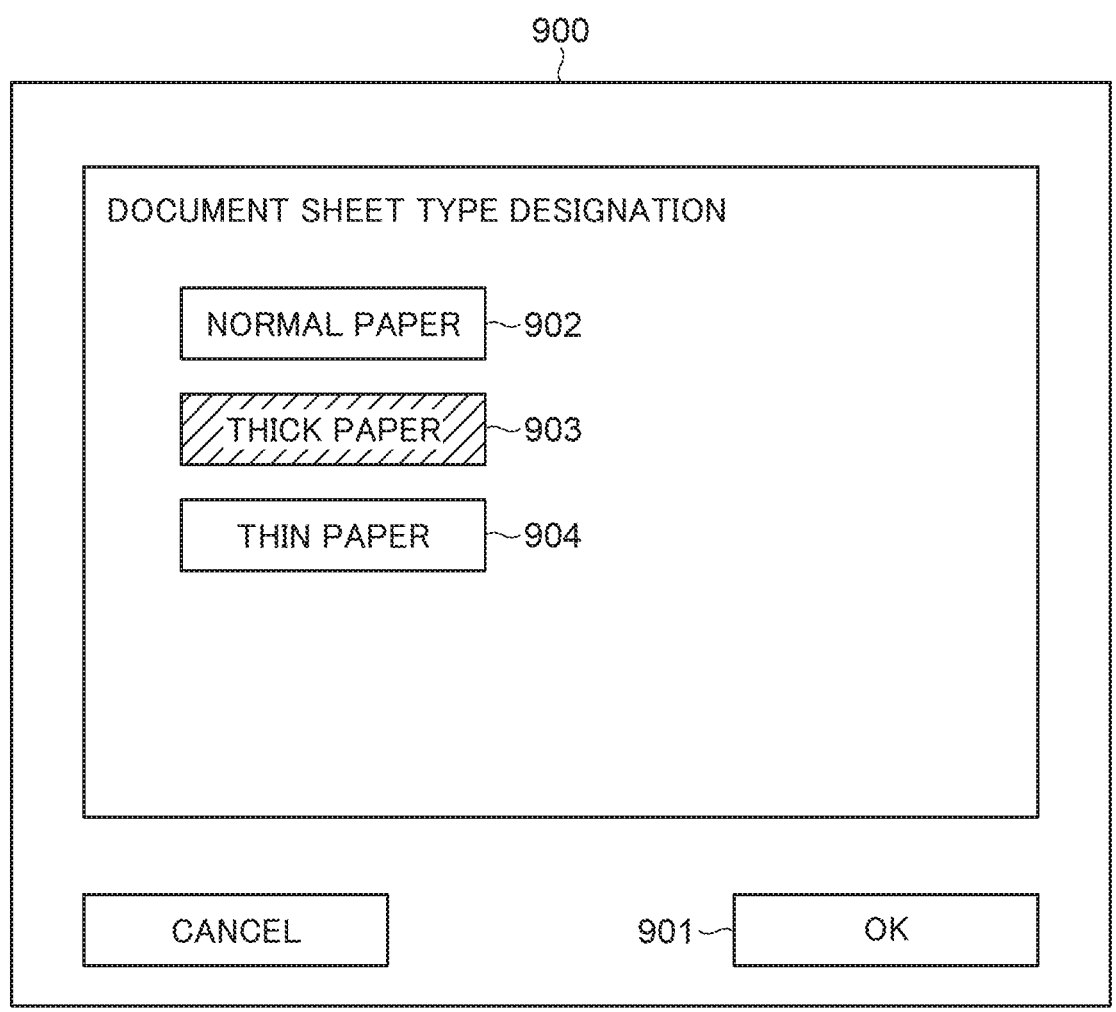
FIG. 9 is a diagram showing an example of an document sheet type selection screen displayed on a console section appearing in FIG. 1.

Referring to FIG. 8, first, when the CPU 102 receives an instruction for executing a copy job on the console section 109 (step S801), the CPU 102 displays a document sheet type selection screen 900, shown in FIG. 9, on the console section 109. The document sheet type selection screen 900 is a screen for prompting the user to set information concerning a type of the thickness of the document sheet placed on the document tray 201. Note that in the following description, the information concerning a type of the thickness of the document sheet placed on the document tray 201 is referred to as the document sheet thickness information. The document sheet type selection screen 900 includes an OK button 901. Further, the document sheet type selection screen 900 includes a plurality of buttons each corresponding to the document sheet thickness information, such as a normal paper button 902, a thick paper button 903, and a thin paper button 904. Note that although in the present embodiment, the description is given of a case where options of the document sheet thickness information, which can be selected on the document sheet type selection screen 900, are the three types: the normal paper, the thick paper, and the thin paper, the options are not limited to the three types, but may include other options. When the user selects the OK button 901 on the document sheet type selection screen 900 in a state in which one of the normal paper button 902, the thick paper button 903, and the thin paper button 904 has been selected, the CPU 102 performs a document sheet type notification process, described hereinafter with reference to FIG. 10 (step S802). Then, the CPU 102 performs a scan control process, described hereinafter with reference to FIG. 11 (step S803). Further, the CPU 102 performs a print control process, described hereinafter with reference to FIG. 15, in parallel with the step S803 (step S804). If the copy job received in the step S801 is a job for copying a plurality of pages of the document, the CPU 102 executes the steps S803 and S804 for each page. Then, the CPU 102 determines whether or not any document sheet remains in the DF unit 200 (step S805).

If it is determined in the step S805 that any document sheet remains in the DF unit 200, the CPU 102 returns to the step S803. If it is determined in the step S805 that no document sheet remains in the DF unit 200, the CPU 102 determines whether or not all pages have been printed (step S806).

If it is determined in the step S806 that there is a page which has not been printed, the CPU 102 returns to the step S804. If it is determined in the step S806 that all pages have been printed, the CPU 102 terminates the present process.

Figure 10:
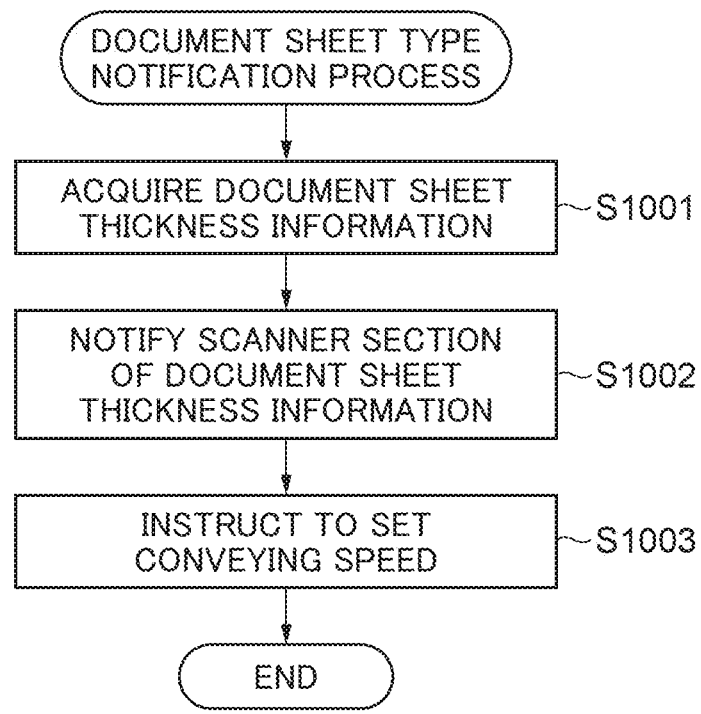
FIG. 10 is a flowchart of a document sheet type notification process in a step in FIG. 8.

FIG. 10 is a flowchart of the document sheet type notification process in the step S802 in FIG. 8

Referring to FIG. 10, the CPU 102 acquires the document sheet thickness information set on the document sheet type selection screen 900 (step S1001). Then, the CPU 102 notifies the scanner section 114 of the acquired document sheet thickness information (step S1002). Then, the CPU 102 instructs the scanner section 114 to set the document conveying speed (step S1003) (operation of the conveying speed control unit). The scanner section 114 having received this instruction sets the document conveying speed based on the notified document sheet thickness information and the management table 1402, described hereinafter with reference to FIG. 14B. Then, the CPU 102 terminates the present process and executes the step S803.

Figure 11:
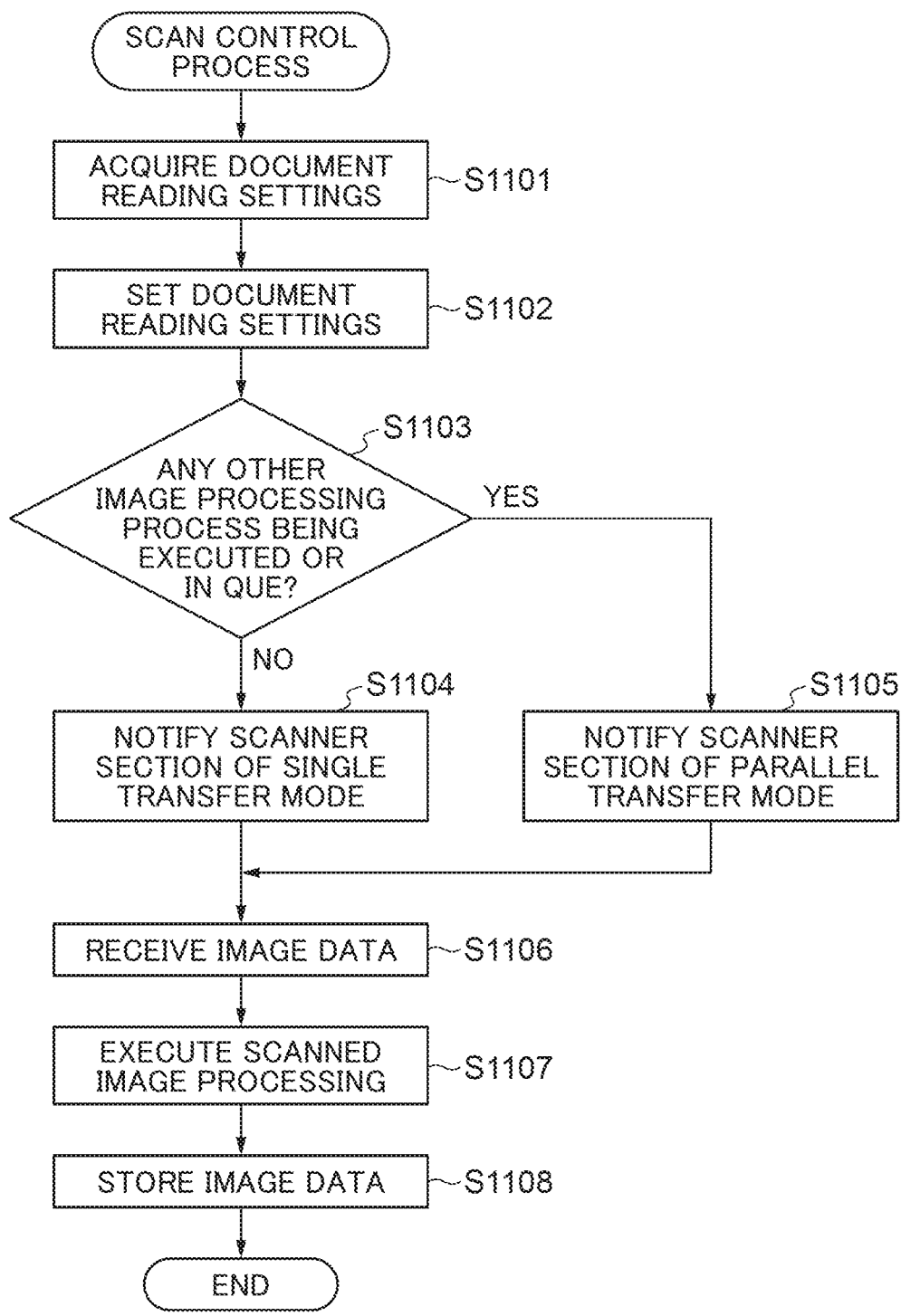
FIG. 11 is a flowchart of a scan control process in a step in FIG. 8.

FIG. 11 is a flowchart of the scan control process in the step S803 in FIG. 8.

Referring to FIG. 11, the CPU 102 acquires document reading settings of the copy job set on the console section 109 (step S1101). Then, the CPU 102 determines an ASIC (scan ASIC 701) for executing the scanned image processing process out of the ASICs 701 to 705 of the image processor 113, and configures the settings of the determined ASIC according to the document reading settings (step S1102). Then, the CPU 102 determines whether or not, any other image processing process, performed by an ASIC other than the determined ASIC, is being executed or is in que (step S1103). The other image processing process is e.g. a raster image processing process, sending, and faxing. In the sending, image data stored in the storage memory 105 is converted to a data format, such as JPEG and PDF. In the faxing, image data is converted to an image format for fax transmission.

If it is determined in the step S1103 that no other image processing process is being executed or is in que, the CPU 102 sends a notification to the scanner section 114, for instructing the scanner section 114 to operate in a single transfer mode (step S1104). The scanner section 114 having received this notification executes a PLL setting process, described hereinafter with reference to FIG. 13, and configures the settings of the PLL e.g. according to the single transfer mode. In the single transfer mode, the clock controller 303 sets the frequency of the transfer enable clock 402 to a predetermined frequency set in advance, and the scanner section 114 transfers image data to the controller 101 according to the set transfer enable clock 402. Then, the CPU 102 executes a step S1106, described hereinafter.

Figure 12:
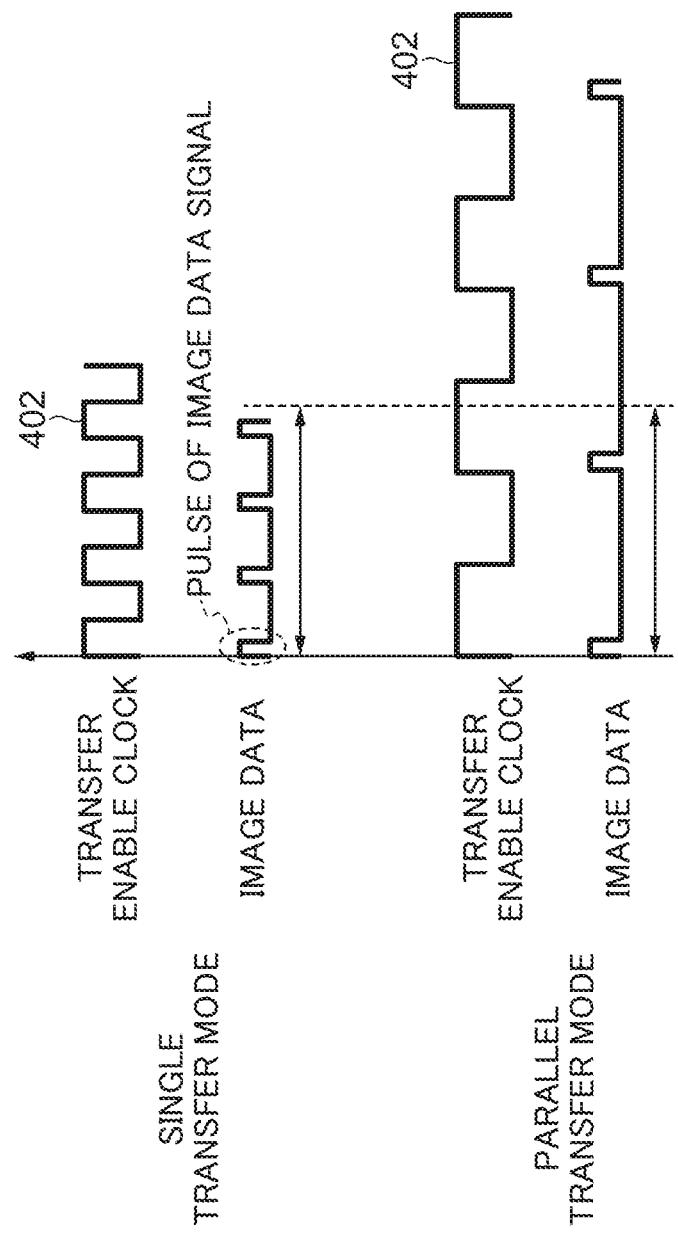
FIG. 12 is a diagram useful in explaining transfer of image data in a parallel transfer mode, performed by the scanner section appearing in FIG. 1.

If it is determined in the step S1103 that any other image processing process is being executed or is in que, the CPU 102 sends a notification to the scanner section 114, for instructing the scanner section 114 to operate in a parallel transfer mode (step S1105). The scanner section 114 having received this notification executes the PLL setting process, described hereinafter with reference to FIG. 13, and configures the settings of the PLL e.g. according to the parallel transfer mode. In the parallel transfer mode, the clock controller 303 sets the frequency of the transfer enable clock 402 to a frequency lower than the predetermined frequency and the scanner section 114 transfers image data to the controller 101 according to the set transfer enable clock 402. With this, in the scanned image processing process, as shown in FIG. 12, the number of pulse signals of the image data per unit time is reduced and the amount of data transfer via the image bus 112 per unit time is suppressed. Then, the CPU 102 receives the image data from the scanner section 114 (step S1106) and performs the scanned image processing process on the received image data using the ASIC (scan ASIC 701) configured according to the document reading settings (step S1107). Then, the CPU 102 stores the image data subjected to the scanned image processing process in the RAM 104 (step S1108), followed by terminating the present process.

Figure 13:
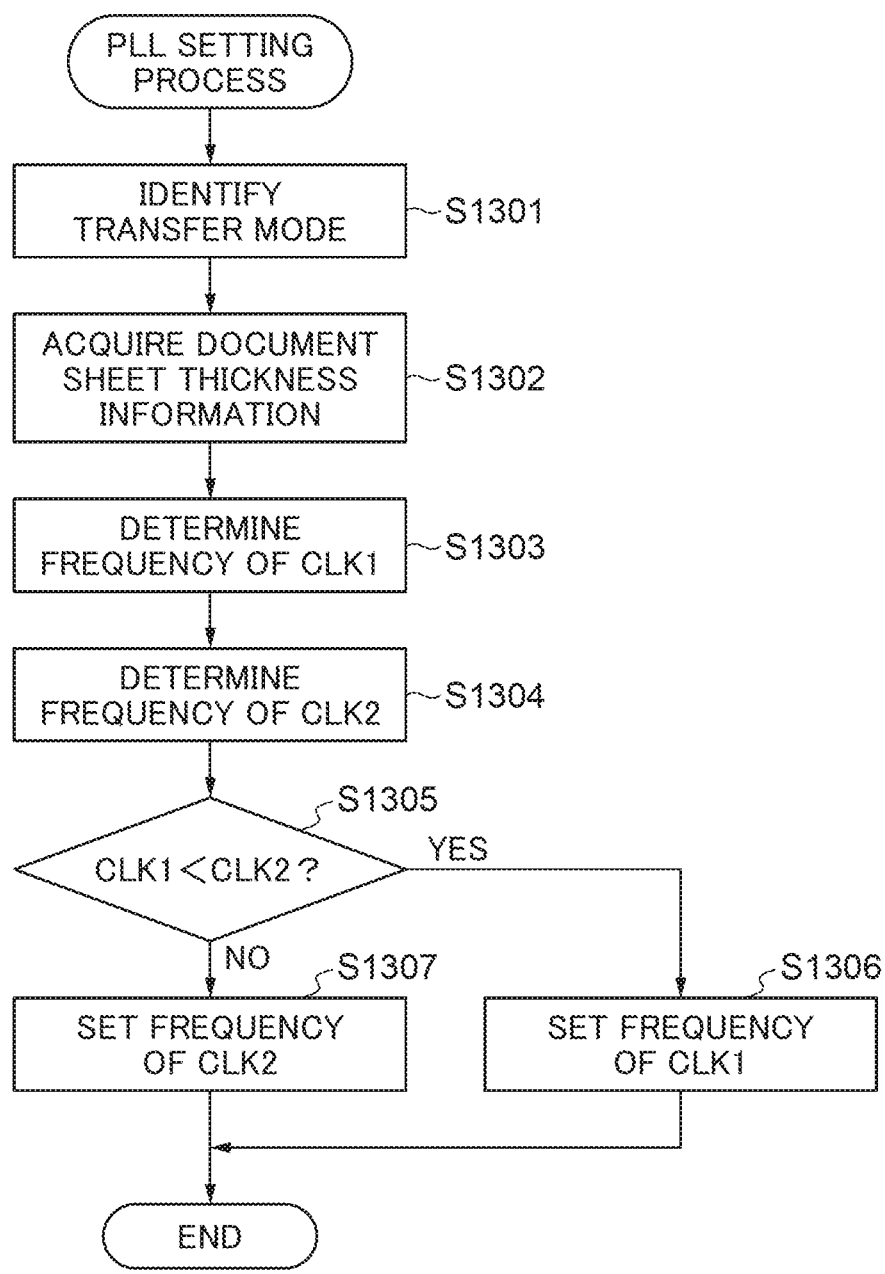
FIG. 13 is a flowchart of a PLL setting process performed by the scanner control unit shown in FIG. 3.

FIG. 13 is a flowchart of the PLL setting process performed by the scanner control unit 300 shown in FIG. 3. The process in FIG. 13 is performed by the scanner section control application. The process in FIG. 13 is performed when the scanner section 114 receives the notification sent from the controller 101 in the step S1104 or S1105.

Referring to FIG. 13, first, the scanner control unit 300 identifies the transfer mode based on the notification received from the controller 101 (step S1301). Then, the scanner control unit 300 acquires the document sheet thickness information (step S1302). Then, the scanner control unit 300 determines the frequency of an image transfer clock CLK1, corresponding to the transfer mode identified in the step S1301, based on the management table 1401 shown in FIG. 14A (step S1303). In the management table 1401, the frequencies of the plurality of types of clocks, such as a conveyance control clock and the image transfer clock, are set for each transfer mode. Then, the scanner control unit 300 determines the frequency of an image transfer clock CLK2, corresponding to the document sheet thickness information acquired in the step S1302, based on the management table 1402 shown in FIG. 14B (step S1304). In the management table 1402, the frequencies of the plurality of types of clocks, such as the conveyance control clock and the image transfer clock, are set for each thickness of the document sheet. Then, the scanner control unit 300 determines whether or not the frequency of the image transfer clock CLK2 is higher than the frequency of the image transfer clock CLK1 (step S1305).

If it is determined in the step S1305 that the frequency of the image transfer clock CLK2 is higher than the frequency of the image transfer clock CLK1, the scanner control unit 300 sets the PLL to the frequency of the image transfer clock CLK1 (step S1306). With this, the frequency of the transfer enable clock 402 is adjusted to the frequency of the image transfer clock CLK1. Then, the scanner control unit 300 terminates the present process.

If it is determined in the step S1305 that the frequency of the image transfer clock CLK2 is lower than or equal to the frequency of the image transfer clock CLK1, the scanner control unit 300 sets the PLL to the frequency of the image transfer clock CLK2 (step S1307). With this, the frequency of the transfer enable clock 402 is adjusted to the frequency of the image transfer clock CLK2. That is, in the present embodiment, a clock which is the smaller in frequency of the image transfer clock CLK1 determined based on the transfer mode and the image transfer clock CLK2 determined based on the document sheet thickness information is used as the frequency of the transfer enable clock 402. Then, the scanner control unit 300 terminates the present process.

Figure 15:
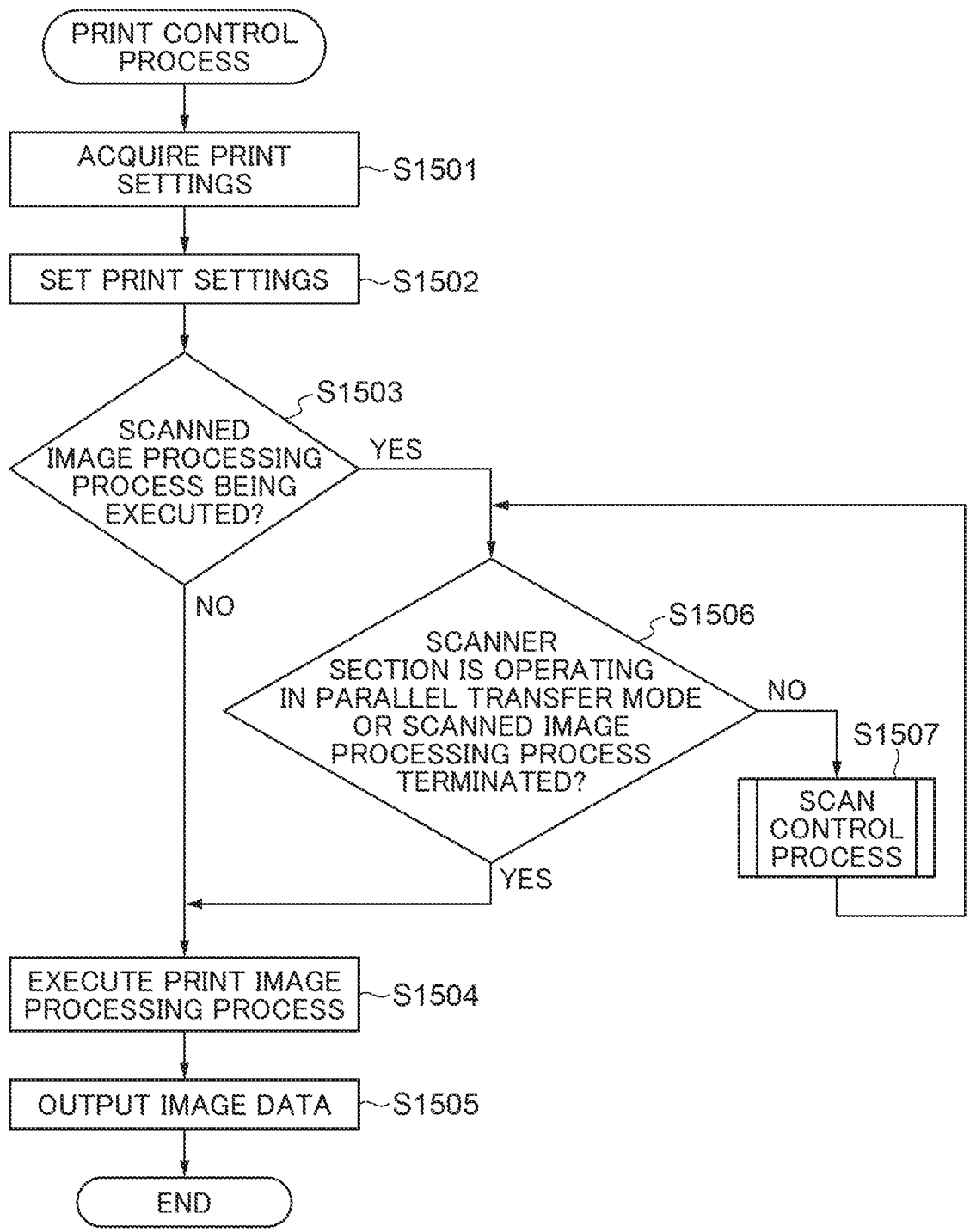
FIG. 15 is a flowchart of a print control process in a step in FIG. 8.

FIG. 15 is a flowchart of the print control process in the step S804 in FIG. 8.

Referring to FIG. 15, the CPU 102 acquires the print settings of the copy job, set on the console section 109 (step S1501). Then, the CPU 102 determines an ASIC (print ASIC 705) for executing a print image processing process out of the ASICs 701 to 705 of the image processor 113 and configures the settings of the determined ASIC according to the acquired print settings (step S1502). The print image processing process includes e.g. the above-mentioned raster image processing process. Then, the CPU 102 determines whether or not the scanned image processing process is being executed (step S1503).

If it is determined in the step S1503 that scanned image processing process is not being executed, the CPU 102 performs the print image processing process on the image data stored in the RAM 104 using the ASIC (print ASIC 705) which has been configured according to the print settings (step S1504). Then, the CPU 102 outputs the image data subjected to the print image processing process to the printer section 115 (step S1505), followed by terminating the present process.

If it is determined in the step S1503 that the scanned image processing process is being executed, the CPU 102 determines whether or not, the scanner section 114 is operating in the parallel transfer mode or the scanned image processing process has been terminated (step S1506).

If it is determined in the step S1506 that the scanner section 114 is not operating in the parallel transfer mode and the scanned image processing process has not been terminated, the CPU 102 performs the scan control process in FIG. 11 (step S1507). After execution of the step S1507, the CPU 102 returns to the step S1506.

If it is determined in the step S1506 that the scanner section 114 is operating in the parallel transfer mode or the scanned image processing process has been terminated, the CPU 102 executes the step S1504 et seq.

According to the above-described embodiment, the document conveying speed is set based on the document sheet thickness information. With this, it is possible to set the document conveying speed suitable for the thickness of the document sheet, and further, it is possible to prevent occurrence of an error due to the thickness of the conveyed document sheet. Further, in the above-described embodiment, the first frequency is determined based on whether or not one image processing process is executed in parallel with any other image processing process different from the one image processing process, and the second frequency is determined based on the document sheet thickness information. A frequency which is the lower of the first frequency and the second frequency is used as the frequency of the transfer enable clock 402. With this, it is possible to suppress the amount of data transfer per unit time via the image bus by the one image processing process, whereby it is possible to realize data transfer via the image bus by the other image processing process in parallel with the one image processing process. As a result, it is possible to prevent occurrence of an error due to an increase in the amount of data transfer per unit time via the image bus. That is, in the above-described embodiment, it is possible to prevent occurrence of an error due to an increase in the amount of data transfer per unit time (data transfer rate) via the image bus, while preventing occurrence of an error due to the thickness of the conveyed document sheet.

Further, in the above-described embodiment, the image processor 113 transfers data to or from the scanner section 114, the RAM 104, and the printer section 115, via the one image bus 112. With this, according to such configuration, it is possible to prevent occurrence of an error due to an increase in the amount of data transfer per unit time (data transfer rate) via the image bus while preventing occurrence of an error due to the thickness of the conveyed document sheet.

Although the description is given of the present invention using the above-described embodiment, the present invention is not limited to the above-described embodiment. For example, the step S802 may be executed not only at the start of a job but also whenever each page is read.

Further, in the above-described embodiment, the settings of the PLL for determining the frequency of the image transfer clock may be changed not only at the start of a job but also whenever each page is read.

Although in the above-described embodiment, the frequencies of the image transfer clock are determined from the respective different management tables in the steps S1303 and S1304, this is not limitative. For example, the frequency of the image transfer clock may be determined from a management table 1403, shown in FIG. 14C, in both of the steps S1303 and S1304. In the management table 1403, the frequency of each clock associated with a combination of a type of the transfer mode in the management table 1401 and a type of the thickness of the document sheet in the management table 1402 is set.

Next, a description will be given of an image processing apparatus according to a second embodiment of the present invention. The present embodiment is basically the same in the configuration and effects as the first embodiment and differs from the first embodiment in that the scanner section 114 has a high-speed transfer mode, a normal transfer mode, and a low-speed transfer mode, described hereinafter. Therefore, redundant description of the configuration and effects is omitted, and the following description is given only of different points in the configuration and effects.

Figure 16:
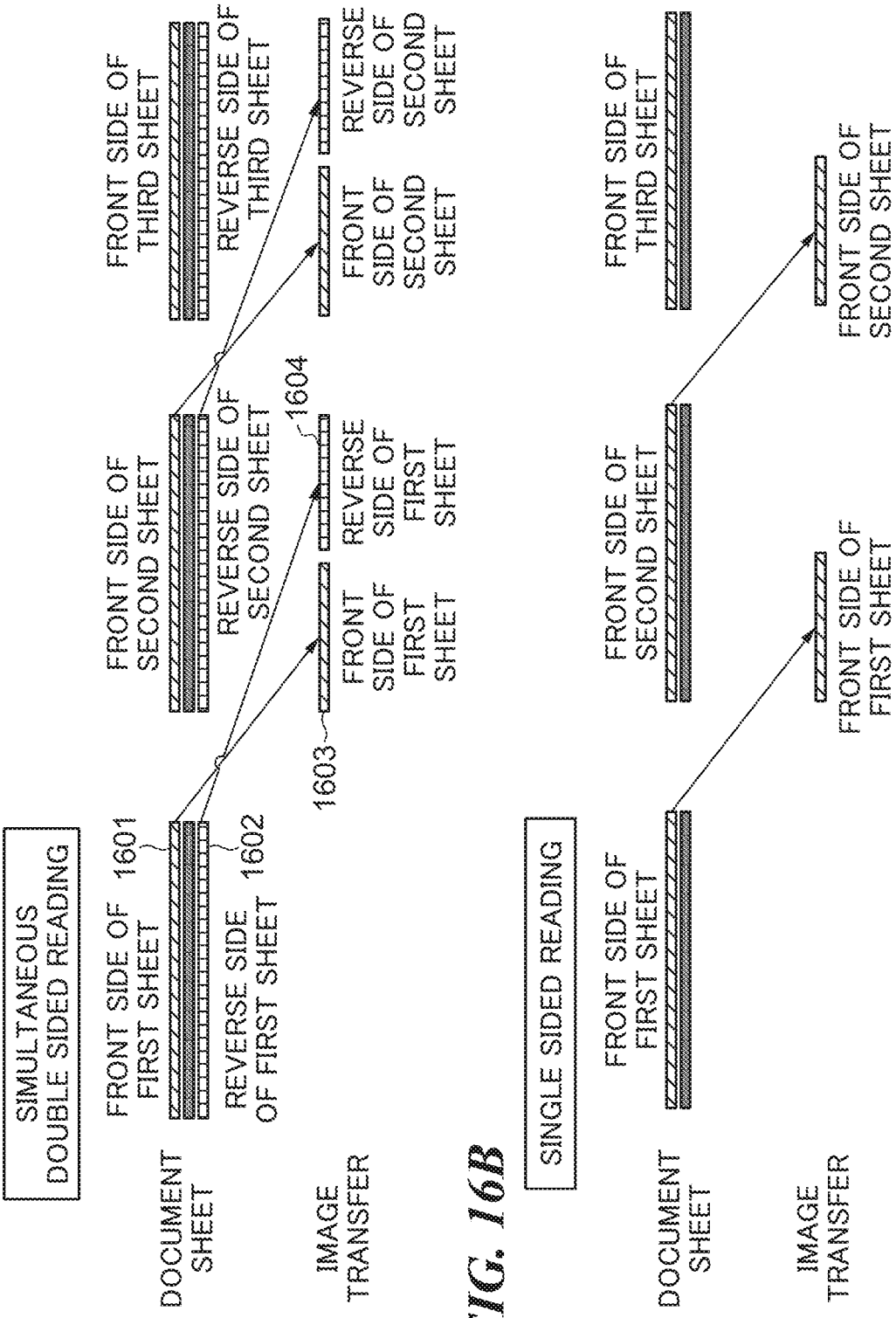
FIGS. 16A and 16B are diagrams useful in explaining simultaneous double sided reading performed by the scanner section appearing in FIG. 1.

The scanner section 114 is equipped with a simultaneous double sided reading function. The scanner section 114 reads both the sides of a front side 1601 and a reverse side 1602 of each single document sheet being conveyed, as shown in FIG. 16A. Further, the scanner section 114 transfers image data items 1603 and 1604 of the two pages of the read front side and reverse side to the controller 101 during the conveyance time of the single document sheet. In other words, the scanner section 114 transfers the image data of one side to the controller 101 in an approximately half of the conveyance time of one document sheet. Further, in a case where the scanner section 114 performs single sided reading, as well, as shown in FIG. 16B, the scanner section 114 transfers image data of one side to the controller 101 in an approximately half of the conveyance time of one document sheet so as to unify the processing between simultaneous double sided reading and single sided reading.

Figure 17:
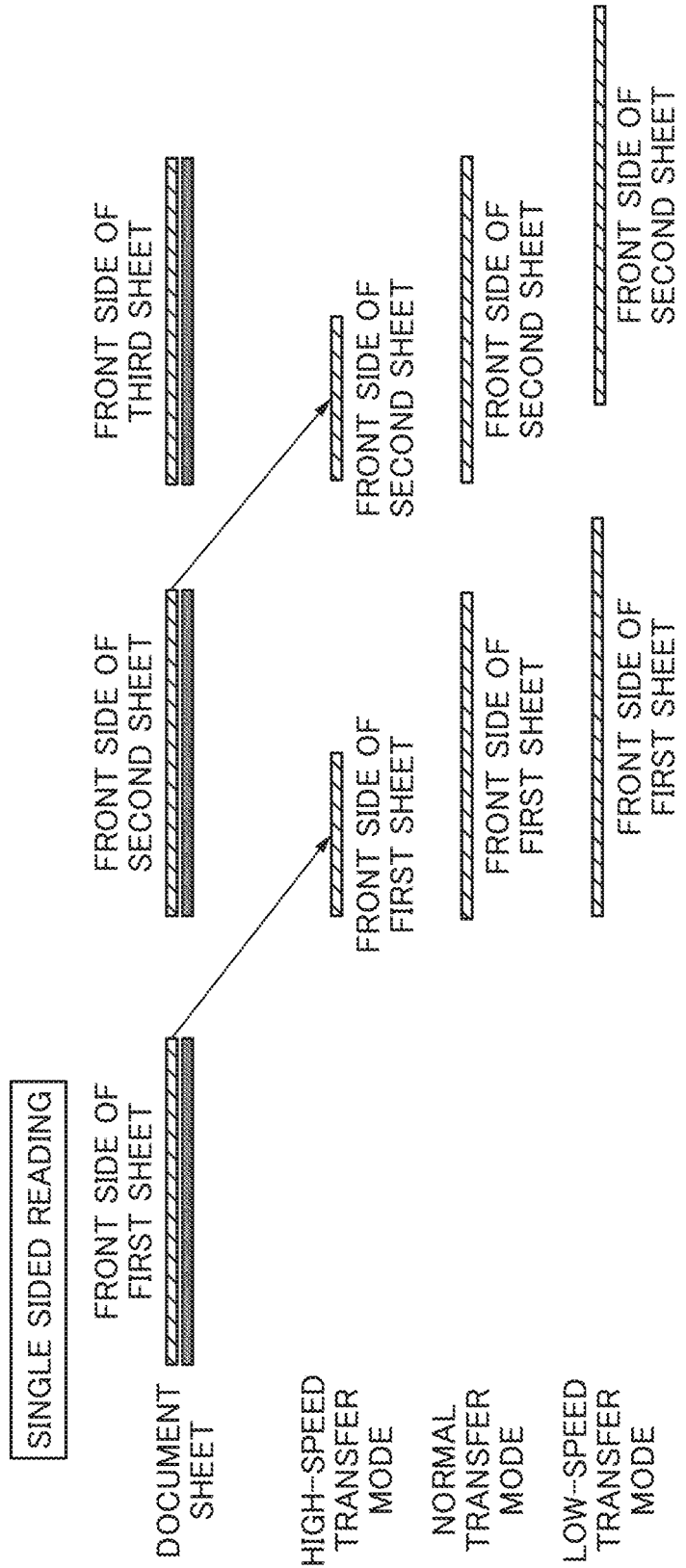
FIG. 17 is a diagram useful in explaining transfer modes of the scanner section appearing in FIG. 1.

In the present embodiment, as the transfer mode of the scanner section 114, used when performing single sided reading, one of the high-speed transfer mode, the normal transfer mode, and the low-speed transfer mode, as shown in FIG. 17, can be set. In the high-speed transfer mode, the scanner section 114 transfers image data according to the transfer enable clock 402 of a frequency at which image data of one side can be transferred in an approximately half of the conveyance time of one document sheet. In the normal transfer mode, the scanner section 114 transfers image data according to the transfer enable clock 402 of a frequency at which image data of one side can be transferred during the conveyance time of one document sheet. In the low-speed transfer mode, the scanner section 114 transfers image data according to the transfer enable clock 402 of a frequency at which image data of one side can be transferred in a predetermined time period slightly longer than the conveyance time of one document sheet.

Figure 18:
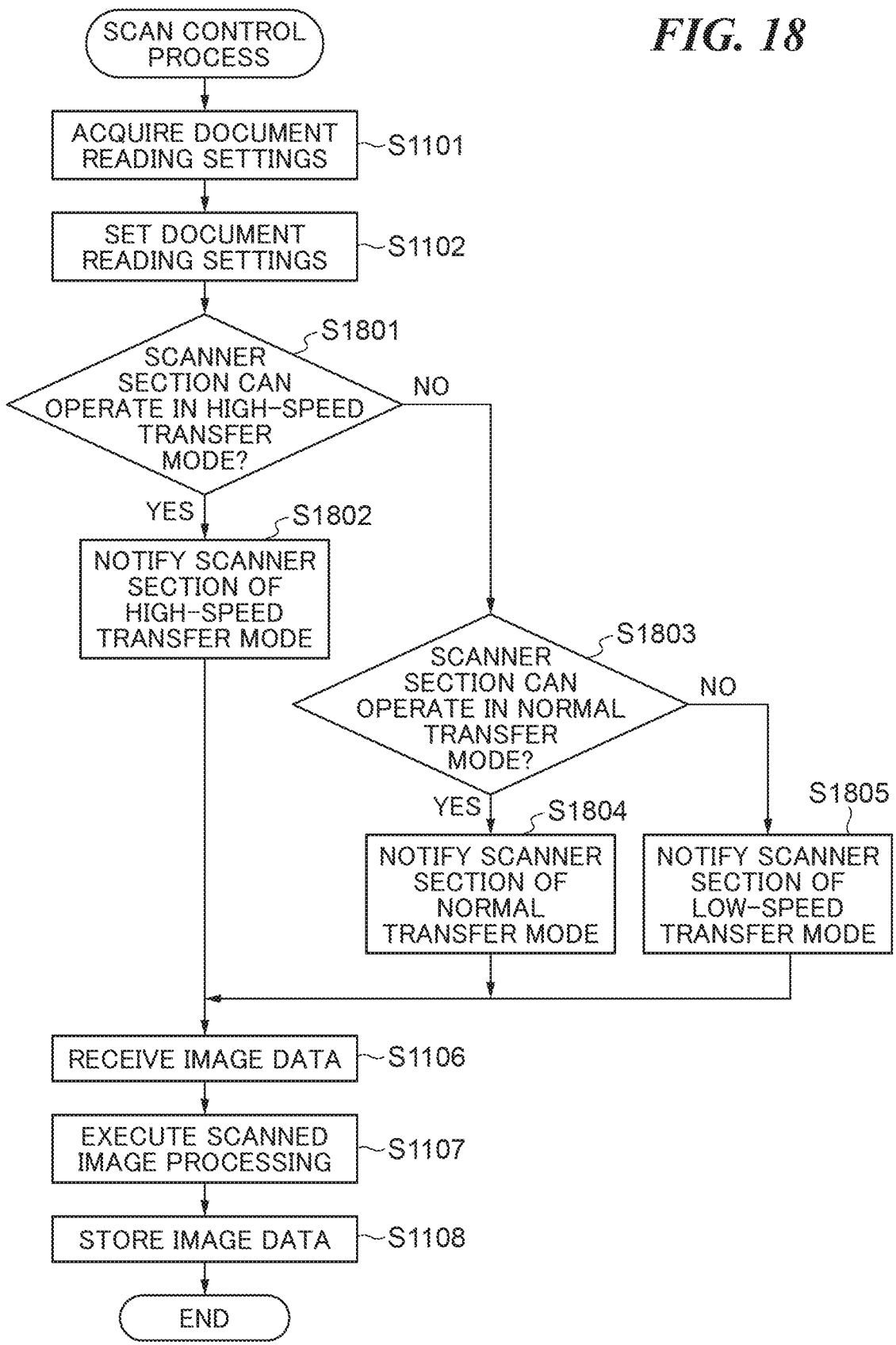
FIG. 18 is a flowchart of a scan control process performed by an MFP as an image processing apparatus according to a second embodiment of the present invention.

FIG. 18 is a flowchart of a scan control process performed by the MFP 100 as the image processing apparatus according to the second embodiment of the present invention. The process in FIG. 18 is performed assuming that a received job is a job including a single-side scanned image processing process.

Referring to FIG. 18, the CPU 102 executes the steps S1101 and S1102. Then, the CPU 102 determines whether or not it is possible to operate the scanner section 114 in the high-speed transfer mode (step S1801). For example, as shown in FIG. 19A, in a case where the number of image processing processes to be executed in parallel with each other, including the scanned image processing process, is not larger than two, even when the scanner section 114 operates in the high-speed transfer mode, the amount of data transfer via the image bus 112 never exceeds the upper limit of the amount of transferable data. In this case, in the step S1801, the CPU 102 determines that it is possible to operate the scanner section 114 in the high-speed transfer mode. On the other hand, in a case where the number of image processing processes to be executed in parallel with each other, including the scanned image processing process, is three or more, there is a possibility that the amount of data to be transferred via the image bus 112 exceeds the upper limit of the amount of transferable data when the scanner section 114 operates in the high-speed transfer mode. In this case, in the step S1801, the CPU 102 determines that it is impossible to operate the scanner section 114 in the high-speed transfer mode.

If it is determined in the step S1801 that it is possible to operate the scanner section 114 in the high-speed transfer mode, the CPU 102 sends a notification to the scanner section 114, for instructing the scanner section 114 to operate in the high-speed transfer mode (step S1802). The scanner section 114 having received this notification performs the PLL setting process in FIG. 13 based on a management table 2001 shown in FIG. 20A and a management table 2002 shown in FIG. 20B. In the management table 2001, the frequencies of the plurality of types of clocks, such as the conveyance control clock and the image transfer clock, are set for each transfer mode. In the management table 2002, the frequencies of the plurality of types of clocks, such as the conveyance control clock and the image transfer clock, are set for each thickness of the document sheet. The scanner control unit 300 configures the settings of the PLL such that the frequency of the transfer enable clock 402 becomes a frequency associated e.g. with the high-speed transfer mode. The scanner section 114 transfers image data to the controller 101 according to the transfer enable clock 402 set as above. Then, the CPU 102 executes the step S1106 et seq.

If it is determined in the step S1801 that it is impossible to operate the scanner section 114 in the high-speed transfer mode, the CPU 102 determines whether or not it is possible to operate the scanner section 114 in the normal transfer mode (step S1803). For example, as shown in FIG. 19B, in a case where the number of image processing processes to be executed in parallel with each other, including the scanned image processing process, is not larger than three, even when the scanner section 114 operates in the normal transfer mode, the amount of data to be transferred via the image bus 112 never exceeds the upper limit of the amount of transferable data. In this case, in the step S1803, the CPU 102 determines that it is possible to operate the scanner section 114 in the normal transfer mode. On the other hand, as shown in FIG. 19C, in a case where the number of image processing processes to be executed in parallel with each other, including the scanned image processing process, is four or more, there is a high possibility that the amount of data to be transferred via the image bus 112 exceeds the upper limit of the amount of transferable data when the scanner section 114 operates in the normal transfer mode. In this case, in the step S1803, the CPU 102 determines that it is impossible to operate the scanner section 114 in the normal transfer mode.

If it is determined in the step S1803 that it is possible to operate the scanner section 114 in the normal transfer mode, the CPU 102 sends a notification to the scanner section 114, for instructing the scanner section 114 to operate in the normal transfer mode (step S1804). The scanner section 114 having received this notification performs the PLL setting process based on the management table 2001 and the management table 2002. The scanner control unit 300 configures the settings of the PLL such that the frequency of the transfer enable clock 402 becomes a frequency which is the lower of the first frequency and the second frequency, as described above. The scanner section 114 transfers image data to the controller 101 according to the transfer enable clock 402 set as above. Then, the CPU 102 executes the step S1106 et seq.

If it is determined in the step S1803 that it is impossible to operate the scanner section 114 in the normal transfer mode, the CPU 102 sends a notification to the scanner section 114, for instructing the scanner section 114 to operate in the low-speed transfer mode (step S1805). The scanner section 114 having received this notification performs the PLL setting process based on the management table 2001 and the management table 2002. Then, the CPU 102 executes the step S1106 et seq.

Figure 21:
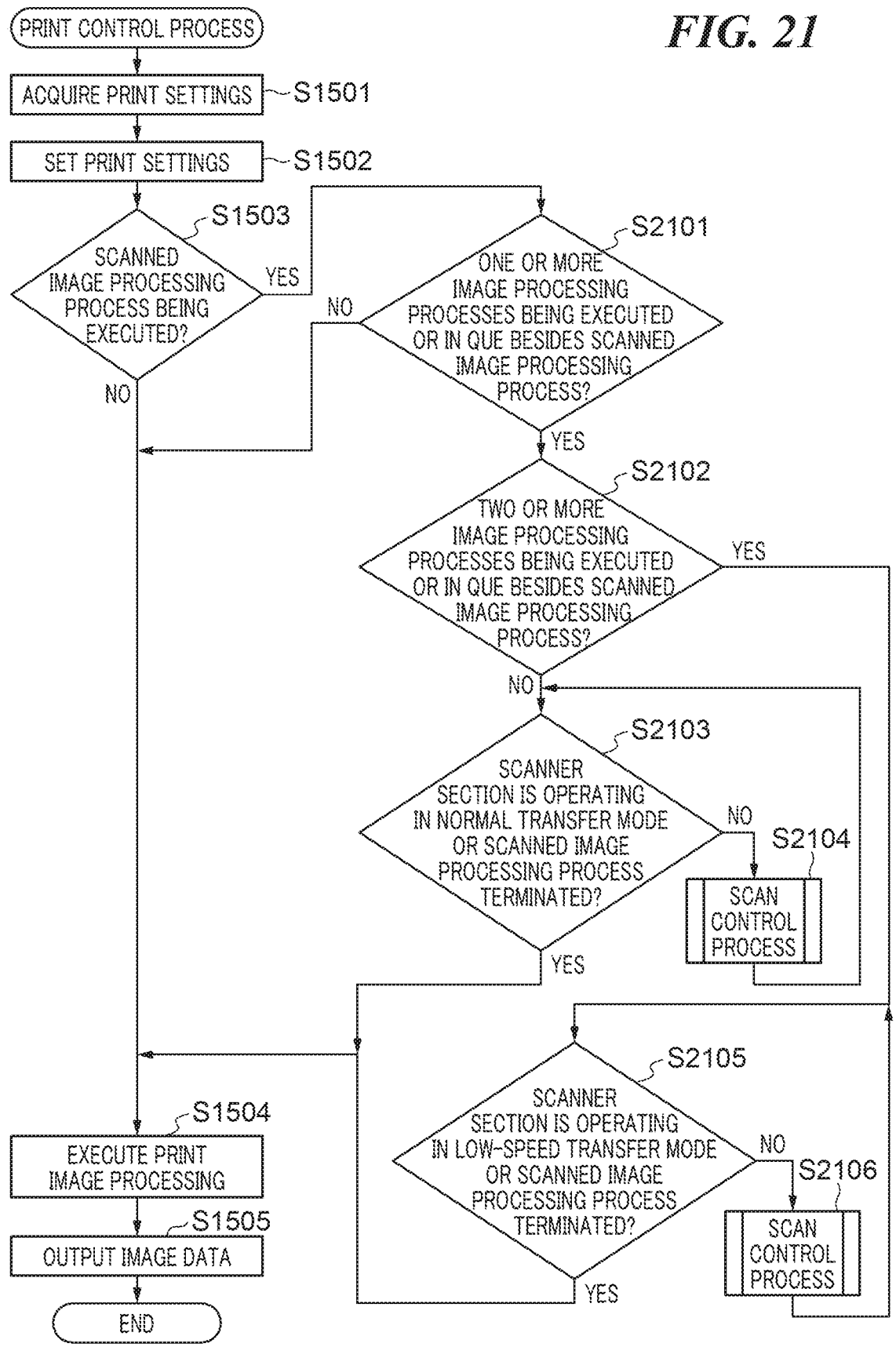
FIG. 21 is a flowchart of a print control process performed by the MFP as the image processing apparatus according to the second embodiment of the present invention.

FIG. 21 is a flowchart of a print control process performed by the MFP 100 as the image processing apparatus according to the second embodiment of the present invention.

Referring to FIG. 21, the CPU 102 executes the steps S1501 to S1503. If it is determined in the step S1503 that the scanned image processing process is not being executed, the CPU 102 executes the step S1504 et seq.

If it is determined in the step S1503 that the scanned image processing process is being executed, the CPU 102 determines whether or not one or more image processing processes are being executed or are in que besides the scanned image processing process (step S2101).

If it is determined in the step S2101 that one or more image processing processes are neither being executed nor are in que besides the scanned image processing process, the CPU 102 executes the step S1504 et seq. If it is determined in the step S2101 that one or more image processing processes are being executed or are in que besides the scanned image processing process, the CPU 102 determines whether or not the number of the image processing processes other than the scanned image processing process, which are being executed or are in que, is two or more (step S2102).

If it is determined in the step S2102 that the number of the image processing processes other than the scanned image processing process, which are being executed or are in que, is smaller than two, the CPU 102 executes a step S2103. In the step S2103, the CPU 102 determines whether or not the scanner section 114 is operating in the normal transfer mode or the scanned image processing process has been terminated.

If it is determined in the step S2103 that the scanner section 114 is operating in the normal transfer mode or the scanned image processing process has been terminated, the CPU 102 executes the step S1504 et seq. If it is determined in the step S2103 that the scanner section 114 is not operating in the normal transfer mode and the scanned image processing process has not been terminated, the CPU 102 performs the scan control process in FIG. 18 (step S2104). After execution of the step S2104, the CPU 102 returns to the step S2103.

If it is determined in the step S2102 that two or more image processing processes are being executed or are in que besides the scanned image processing process, the CPU 102 executes a step S2105. In the step S2105, the CPU 102 determines whether or not the scanner section 114 is operating in the low-speed transfer mode or the scanned image processing process has been terminated.

If it is determined in the step S2105 that the scanner section 114 is operating in the low-speed transfer mode or the scanned image processing process has been terminated, the CPU 102 executes the step S1504 et seq. If it is determined in the step S2105 that the scanner section 114 is not operating in the low-speed transfer mode and the scanned image processing process has not been terminated, the CPU 102 performs the scan control process in FIG. 18 (step S2106). After execution of the step S2106, the CPU 102 returns to the step S2105.

In the above-described embodiment, the second frequency is determined out of the plurality of candidates based on the number of other image processing processes executed in parallel with one image processing process. With this, it is possible to determine a proper frequency, at which it is possible to prevent occurrence of an error due to an increase in the amount of data transfer per unit time (data transfer rate) via the image bus, as the candidate of the frequency of the image transfer clock, according to the number of the other image processing processes executed in parallel with the one image processing.

Figure 22A:
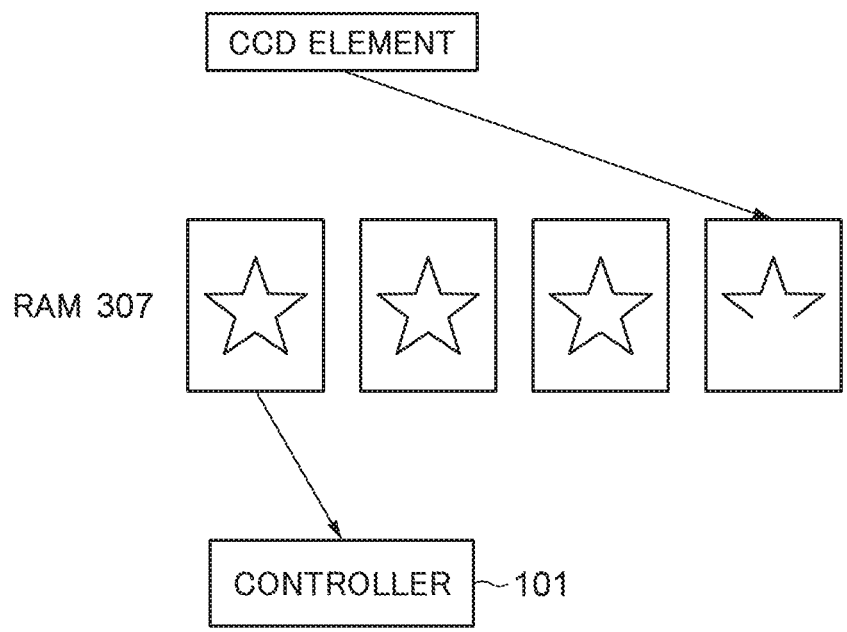
FIGS. 22A and 22B are diagrams useful in explaining document reading control in a case where the RAM appearing in FIG. 3 has been used up.
Figure 22B:
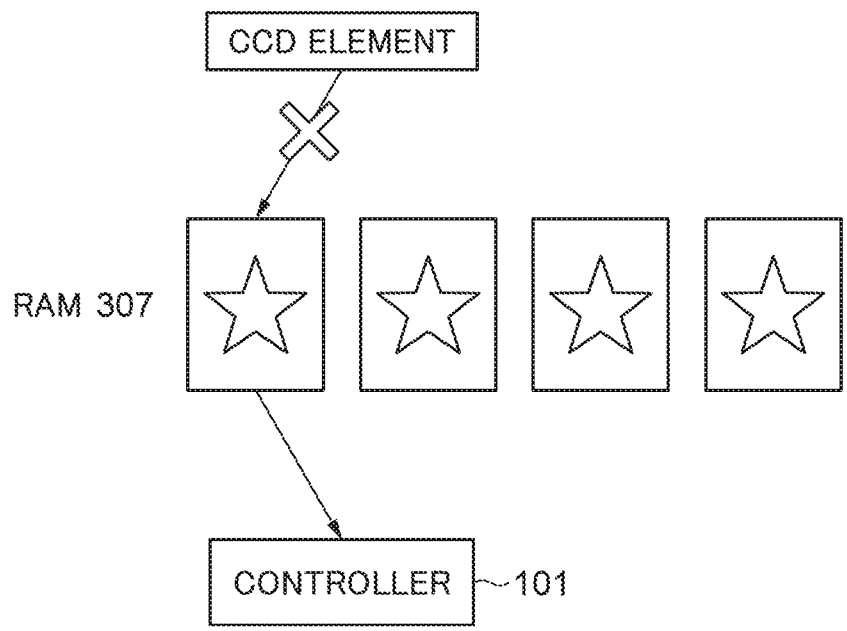

Note that in the above-described embodiment, in the low-speed transfer mode, the transfer time of image data of one sheet is longer than the reading time of one document sheet, and hence if reading of the document sheet is continued in this state, the storage area of the RAM 307 of the scanner section 114 is to be used up. In a case where the RAM 307 is used up, as shown in FIGS. 22A and 22B, it is preferable to stop reading of the document sheet until the scanner section 114 terminates the transfer of image data of one sheet to the controller 101 and a sufficient free space is secured in the RAM 307. Alternatively, the use state of the RAM 307 may be checked, and the frequency of the readout clock 401 may be temporarily lowered to a frequency lower than the frequency of the transfer enable clock 402 in the low-speed transfer mode so as to give priority to prevention of the storage capacity of the RAM 307 from being used up.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-204138, filed Oct. 30, 2018, which is hereby incorporated by reference herein in its entirety.

What is claimed is:

1. An image processing apparatus including a reading unit that reads a document sheet, and an image processing unit that performs an image processing process on image data obtained by reading the document sheet, comprising:
    a conveying speed control unit configured to control a conveying speed of the document sheet based on a thickness of the document sheet;
    a clock control unit configured to control a frequency of an image transfer clock for transferring image data of the document sheet from the reading unit to the image processing unit;
    a first determination unit configured to determine a first frequency based on whether or not the image processing process is executed in parallel with any other image processing process different from the image processing process; and
    a second determination unit configured to determine a second frequency based on the thickness of the document sheet,
    wherein the clock control unit uses a frequency which is the lower of the first frequency and the second frequency as the frequency of the image transfer clock.

2. The image processing apparatus according to claim 1, wherein the first determination unit determines the second frequency out of a plurality of candidates based on the number of the other image processing processes executed in parallel with the image processing process.

3. The image processing apparatus according to claim 1 further comprising:
    a storage unit configured to temporarily store the image data, and
    a print unit configured to print the image data, and
    wherein the image processing unit performs data transfer to or from the reading unit, the storage unit, and the print unit, via one image bus.

4. A method of controlling an image processing apparatus including a reading unit that reads a document sheet, and an image processing unit that performs an image processing process on image data obtained by reading the document sheet, comprising:
    controlling a conveying speed of the document sheet based on a thickness of the document sheet;
    controlling a frequency of an image transfer clock for transferring image data of the document sheet from the reading unit to the image processing unit;
    determining a first frequency based on whether or not the image processing process is executed in parallel with any other image processing process different from the image processing process;
    determining a second frequency based on the thickness of the document sheet; and
    using a frequency which is the lower of the first frequency and the second frequency as the frequency of the image transfer clock.

5. A non-transitory computer-readable storage medium storing a computer-executable program for executing a method of controlling an image processing apparatus including a reading unit that reads a document sheet, and an image processing unit that performs an image processing process on image data obtained by reading the document sheet,
    wherein the method comprises:
    controlling a conveying speed of the document sheet based on a thickness of the document sheet;
    controlling a frequency of an image transfer clock for transferring image data of the document sheet from the reading unit to the image processing unit;
    determining a first frequency based on whether or not the image processing process is executed in parallel with any other image processing process different from the image processing process;
    determining a second frequency based on the thickness of the document sheet; and
    using a frequency which is the lower of the first frequency and the second frequency as the frequency of the image transfer clock.

* * * * *